US012572628B2

(12) United States Patent
Schilders

(10) Patent No.: US 12,572,628 B2
(45) Date of Patent: Mar. 10, 2026

(54) SYSTEMS AND METHODS FOR EXECUTABLE GRAPH-BASED MODEL OWNERSHIP

(71) Applicants: INFOSYS LIMITED, Bangalore, IN (US); InvertIT Inc., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 24 days.

(21) Appl. No.: 18/235,134

(22) Filed: Aug. 17, 2023

(65) Prior Publication Data

US 2024/0303300 A1    Sep. 12, 2024

Related U.S. Application Data

(60) Provisional application No. 63/448,711, filed on Feb. 28, 2023, provisional application No. 63/442,682, filed on Feb. 1, 2023.

(51) Int. Cl.
*G06F 21/10*        (2013.01)
*G06F 8/35*         (2018.01)
*G06F 16/901*       (2019.01)

(52) U.S. Cl.
CPC ........... *G06F 21/1011* (2023.08); *G06F 8/35* (2013.01); *G06F 16/9024* (2019.01); *G06F 21/1085* (2023.08)

(58) Field of Classification Search
CPC ............. G06F 21/1011; G06F 21/1085; G06F 9/5038; G06F 16/24568
See application file for complete search history.

(56) References Cited

U.S. PATENT DOCUMENTS 8,584,099 B1 * 11/2013 Abi-Antoun .............. G06F 8/10
                                                    717/133
10,685,064 B2    6/2020 Johnson et al.
                            (Continued)

FOREIGN PATENT DOCUMENTS

WO      WO-2016000244 A1 *  1/2016  ............. H04L 29/08

OTHER PUBLICATIONS

Giese, Tim, et al., Maintaining Control over Distributed Data Through a Data Sovereignty Model, IEEE 7th International Conference on Information Technology and Digital Applications (ICITDA), Nov. 2022, 7 pages, [retrieved on Apr. 29, 2025], Retrieved from the Internet: <URL:http://ieeexplore.ieee.org/>.*

(Continued)

*Primary Examiner* — Geoffrey R St Leger
(74) *Attorney, Agent, or Firm* — Finnegan, Henderson, Farabow, Garrett & Dunner, LLP

(57)                  ABSTRACT

A method for maintaining ownership integrity of templated executable graph-based models is provided. A node template that comprises a predetermined node structure and rules governing generation of node instances is obtained. A bounded executable run-time node is generated. The bounded executable run-time node comprises the node template, a node instance, and an overlay structure. The overlay structure comprises a run-time overlay and an ownership overlay. The run-time overlay comprises an overlay template and an overlay instance that includes processing logic for interaction with the node template and/or the node instance during execution. The ownership overlay defines an ownership rule associated with the bounded executable run-time node. A stimulus and an associated context are received and, in response to the stimulus being received, execution of the processing logic of the run-time overlay is caused in accordance with the ownership rule of the ownership overlay.

20 Claims, 19 Drawing Sheets

(56) References Cited

U.S. PATENT DOCUMENTS

2014/0075565 A1\* 3/2014 Srinivasan ............. H04L 63/10
726/26
2019/0253457 A1\* 8/2019 Koul ...................... H04L 63/20

OTHER PUBLICATIONS

Khandekar Rohit et al.: "COLA: Optimizing Stream Processing
Applications via Graph Partitioning", In: "European Conference on
Computer Vision", Dec. 31, 2009 1 (Dec. 31, 2009), Springer Berlin
Heidelberg, Copenhagen, Denmark, XP093174216, ISSN: 0302-97
43 vol. 5896, pp. 308-327, DOI: 10. 1007/978-3-642-10445-9_ 16.

\* cited by examiner

100

900

(902)
OBTAIN A FIRST EXECUTABLE NODE
TEMPLATE (904)
GENERATE A FIRST BOUNDED EXECUTABLE
RUN-TIME NODE (906)
RECEIVE A STIMULUS AND ASSOCIATED
CONTEXT (908)
CAUSE EXECUTION OF RUN-TIME OVERLAY (910)
OBTAIN EXECUTION OUTCOME (912)
OUTPUT EXECUTION OUTCOME

1000

(1002)
DISPLAY A FIRST GRAPHICAL
REPRESENTATION (1004)
DISPLAY A PLURALITY OF SECOND
GRAPHICAL REPRESENTATIONS (1006)
RECEIVE A FIRST USER INPUT (1008)
REPLACE THE FIRST GRAPHICAL
REPRESENTATION WITH A FIRST FILTERED
GRAPHICAL REPRESENTATION

SYSTEMS AND METHODS FOR EXECUTABLE GRAPH-BASED MODEL OWNERSHIP

CROSS-REFERENCE TO RELATED APPLICATION

The present application claims priority to U.S. Patent Application No. 63/448,711, filed Feb. 28, 2023, and U.S. Patent Application No. 63/442,682, filed Feb. 1, 2023, which are incorporated herein by reference in their entirety.

TECHNICAL FIELD

The present disclosure relates to executable graph-based models. Particularly, but not exclusively, the present disclosure relates to executable graph-based models which integrate data and data processing functionality. Particularly, but not exclusively, the present disclosure relates to facilitating ownership boundaries within template-driven executable graph-based models.

BACKGROUND

Modern system designs typically separate data storage from any functional data structure used from a processing logic perspective. This separation often occurs when data is "at rest" or at run-time where the processing system interacts with a copy of the relevant data in the processing space that can be of a different representation. This separation also leads to an impedance mismatch which requires some form of a data management solution to perform the necessary mappings between the two states. As a result of this separate of concerns, the processing logic is typically performed in a separate technology and physical tier (in an n-tier architecture) from the data. This is illustrated in the example n-tier architecture shown in FIG. 1.

The example n-tier architecture 100 comprises a presentation layer 102, a processing logic layer 104, a data access layer 106, and a database layer 108. The presentation layer 102 comprises applications or components which are used to display the outputs of the processing logic layer 104 to a user or users. The processing logic layer 104 comprises applications, components, or services which perform some form of processing on the data obtained from the data access layer 106. The data access layer 106 comprises the applications, components, and/or services which can access the data used by the processing logic layer 104 and stored at the database layer 108. The database layer 108 handles the persistent storage of the data used by the system (e.g., in the form of a relational database, flat file, NoSQL database, graph database, and the like).

The layers of the example n-tier architecture 100 are technically separated. Each layer may utilize a separate set of components to perform specific functionality (e.g., a database management system is used in the database layer 108 whilst an enterprise application is used in the processing logic layer 104). The layers of the n-tier architecture 100 may also be physically separated. For example, the database layer 108 may execute on a remote cloud service, the processing logic layer 104 may execute on a network within an enterprise, and the presentation layer 102 may execute on a user device within the enterprise. While some architectural designs require a clear separation of concerns between data and the use of the data, often the separation enforced by architectures such as that illustrated in FIG. 1 can severely inhibit the flexibility, extensibility, and responsiveness of any system created.

Therefore, there is a need for enhanced architectures which provide improved flexibility, extensibility, and responsiveness thereby providing more efficient data processing systems.

SUMMARY OF DISCLOSURE

According to an aspect of the present disclosure, there is provided a method for maintaining ownership integrity of templated executable graph-based models. The method comprises obtaining a first node template comprising a predetermined node structure and one or more rules governing generation of node instances based on the first node template. A first bounded executable run-time node is generated and comprises the first node template, a first node instance generated according to the first node template, and an overlay structure. The overlay structure comprises a run-time overlay and a first ownership overlay. The run-time overlay comprises an overlay template and an overlay instance comprising processing logic operable to interact with the first node template and/or the first node instance during execution. The first overlay ownership overlay defines a first ownership rule associated with the first bounded executable run-time node. A stimulus and an associated context are received and, in response to the stimulus being received, execution of the processing logic of the run-time overlay is caused in accordance with the first ownership rule of the first ownership overlay.

According to a further aspect of the present disclosure, there is provided a method for visualization of owner-based templated executable graph-based models. The method comprises displaying a first graphical representation associated with a templated executable graph-based model. The templated executable graph-based model comprises a plurality of nodes and a plurality of ownership overlay structures, where each ownership structure of the plurality of ownership overlay structures assigns one or more owners of a set of owners to a respective one of the plurality of nodes. The method further comprises displaying, concurrent to the display of the first graphical representation, a plurality of second graphical representations each associated with an owner of the set of owners. A first user input associated with a respective second graphical representation of the plurality of second graphical representations is received, where the respective second graphical representation is associated with a first owner of the set of owners. In response to receiving the first user input, the first graphical representation is replaced with a first filtered graphical representation whilst maintaining display of the second graphical representation. The first filtered graphical representation is based on one or more of the plurality of nodes of the templated executable graph-based model associated with the first owner.

Additional aspects and embodiments of the present systems are disclosed, and the above aspects and embodiments should not be construed as limiting the present disclosure.

BRIEF DESCRIPTION OF FIGURES

Embodiments of the present disclosure will now be described, by way of example only, and with reference to the accompanying drawings, in which.

DETAILED DESCRIPTION

Figure 1:
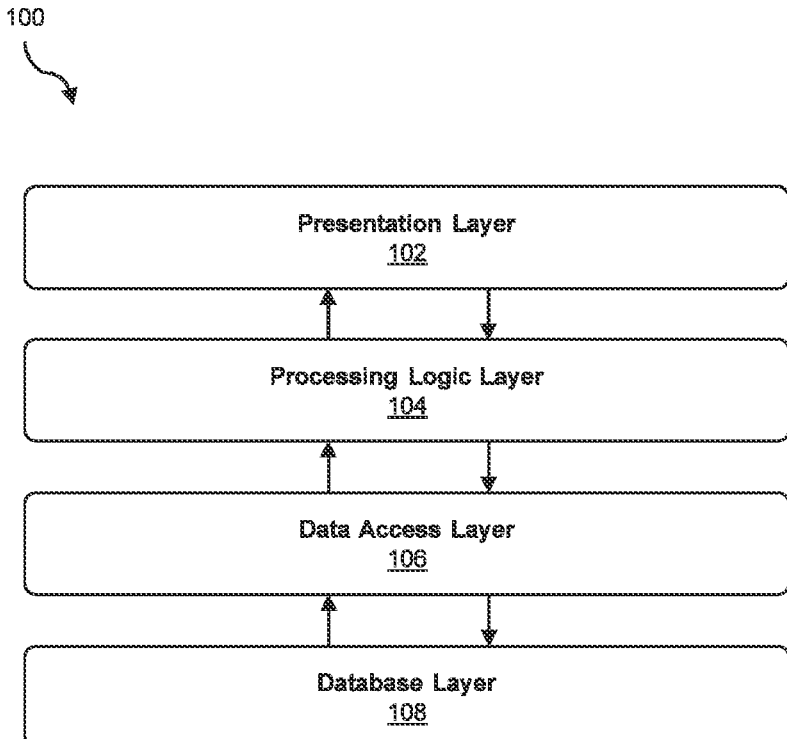
FIG. 1 shows a prior-art n-tier architecture.

Existing architectures, such as that described in relation to FIG. 1 above, maintain a forced technical, and sometimes physical, separation between the processing logic and the data. As previously stated, the technical and physical separation of data and processing logic can be inhibitive to the types of architectural systems that can be created. Furthermore, the complexity of n-tier architectures, and their strict separation of functionality (layers), can severely impact system real-time processing performance. This, in turn, leads to processing delays or latency which reduces the applicability of such architectures being used in time-critical application settings such as medical devices, autonomous vehicles, and real-time control systems. In addition, the central storage of all data within a single database or database layer (e.g., the database layer 108 show in FIG. 1) restricts the ways in which a user may access, maintain, and manage their personal data stored by an enterprise within the single database or database layer.

In general, the present disclosure describes executable graph-based models which dynamically combine data and data processing functionality at run-time whilst their separability may be maintained when at rest. This is illustrated in FIG. 2.

Figure 2:
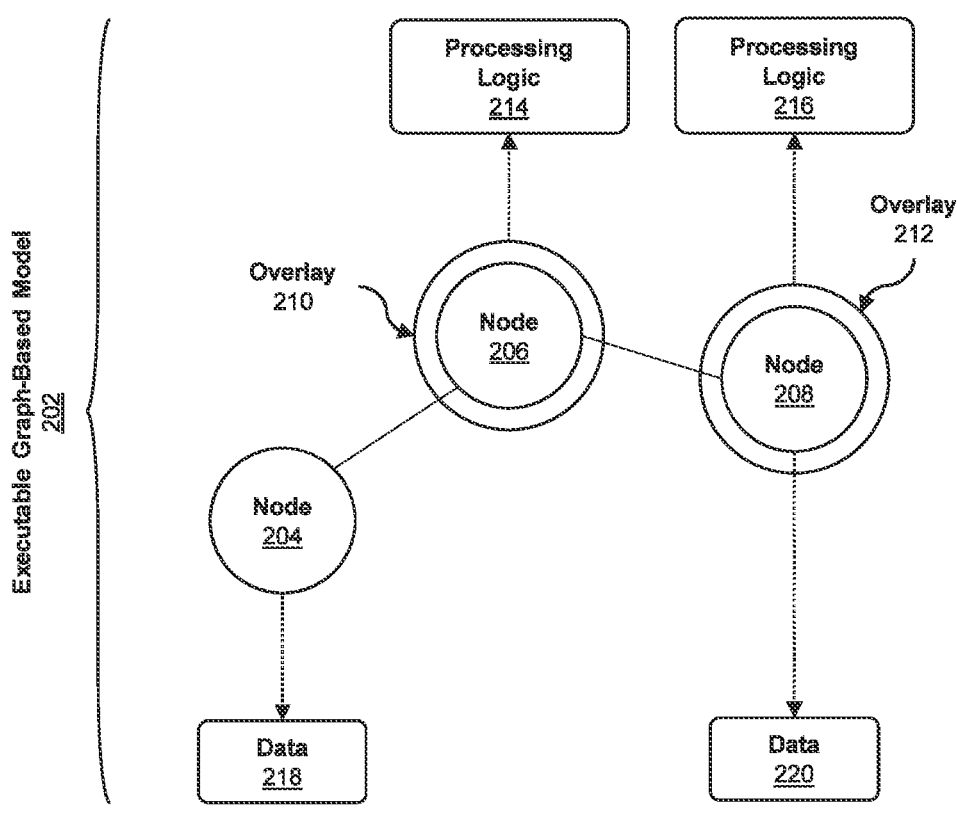
FIG. 2 shows an executable graph-based model according to an aspect of the present disclosure.

FIG. 2 illustrates an executable graph-based model 202 according to an aspect of the present disclosure.

The executable graph-based model 202 is generally formed of a data structure (i.e., a graph-based model, or graphical model) comprising a plurality of nodes 204-08 which can be functionally extended with processing logic via the use overlays 210, 212. Each overlay comprises processing logic, such as processing logic 214 and 216 which are associated with overlays 210 and 212 respectively. At run-time, data such as data 218, 220 is associated with nodes within the executable graph-based model 202 and the overlays 210, 212 provide the functionality to respond to stimuli an interact with, manipulate, or otherwise process the data. As such, the structure and functionality of the data processing is separate from the data itself when offline (or at rest) and is combined dynamically at run-time.

Whilst the executable graph-based model 202 shown in FIG. 2 provides the ability to process stimulus against the overlay structure of the problem space as stimuli requests arrive to be processed by the overlay system, it does not allow for the data structure, data, and processing logic to be owned by more than one owner. In many real world settings, the data structure, data, and processing logic in the overlay structure may need to be composed of components provided by more than one owner.

The present disclosure is directed to ownership within the context of template-based executable graph-based models. Ownership allows the clear identification of data structure, data, process logic, and process logic boundaries and ensures they are maintained before, during, and after stimulus execution. Ownership is implemented as a new set of overlays within the overlay structure of a template-based executable graph-based model. Such ownership overlays allow the in-situ and specific owner-based tagging and execution of components (i.e., nodes) within the template-based executable graph-based model.

Figure 3:
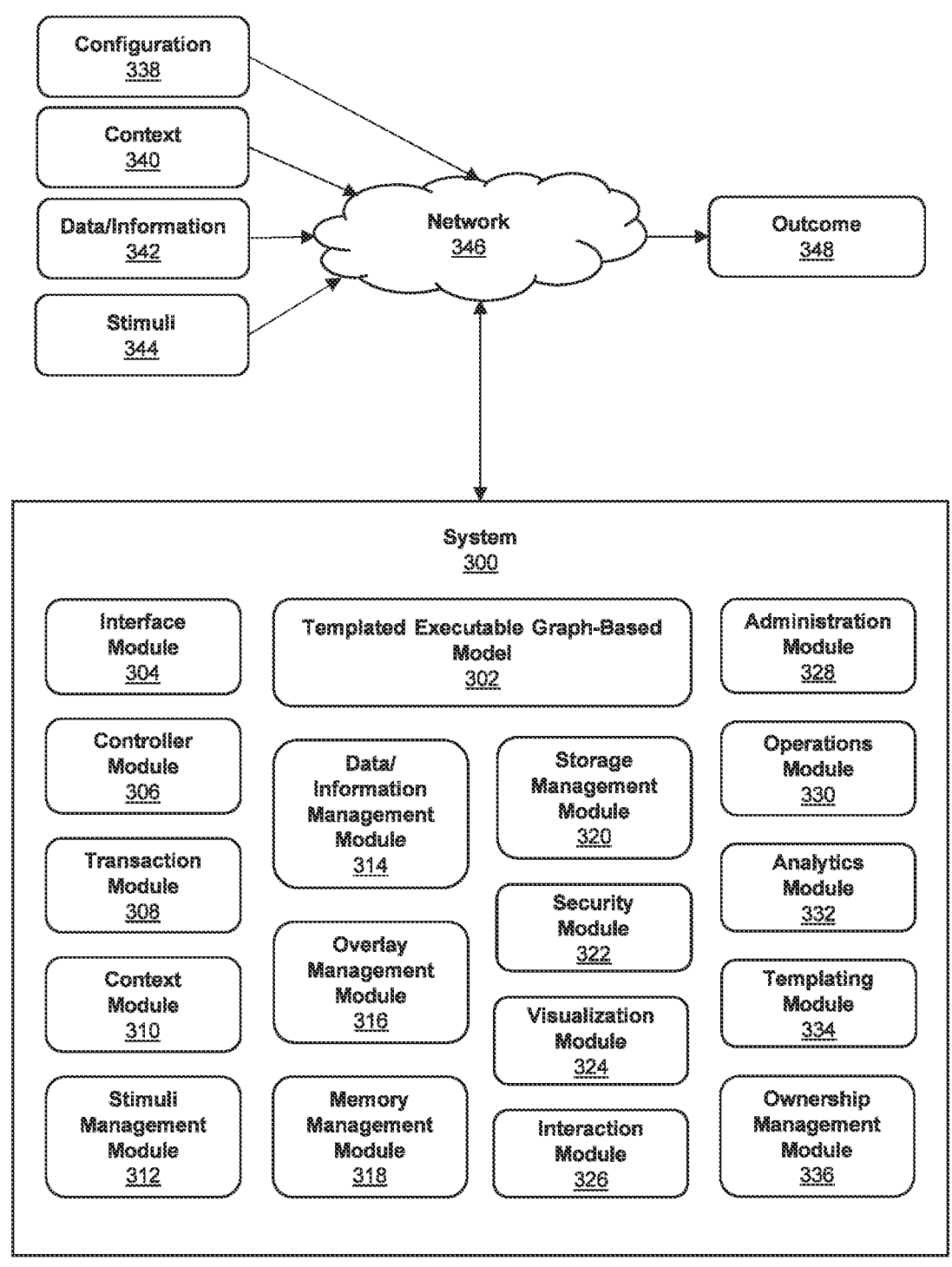
FIG. 3 shows a system for multiple-ownership in template-driven executable graph-based models according to an aspect of the present disclosure.

FIG. 3 shows a system 300 for multi-owner management in template-driven execution, management, and configuration of executable graph-based models according to an aspect of the present disclosure.

The system 300 comprises a templated executable graph-based model 302 as described in brief above in relation to FIG. 2. The system 300 further comprises an interface module 304, a controller module 306, a transaction module 308, a context module 310, a stimuli management module 312, a data management module 314, an overlay management module 316, a memory management module 318, a storage management module 320, a security module 322, a visualization module 324, an interaction module 326, an administration module 328, an operations module 330, an analytics module 332, a templating module 334, and an ownership management module 336. FIG. 3 further shows a configuration 338, a context 340, data 342, stimuli 344, a network 346, and an outcome 348.

The skilled person will appreciate that the present description of the system 300 is not intended to be limiting, and the system 300 can include, or interface with, further modules not expressly described herein. Moreover, the functionality of two or more of the modules can be combined within a single module. Conversely, the functionality of a single module can be split into two or more further modules which can be executed on two or more devices. The modules described below in relation to the system 300 can operate in a parallel, distributed, or networked fashion. The system 300 can be implemented in software, hardware, or a combination of both software and hardware. Examples of suitable hardware modules include, a general-purpose processor, a field programmable gate array (FPGA), and/or an application specific integrated circuit (ASIC). Software modules can be expressed in a variety of software languages such as C, C++, Java, Ruby, Visual Basic, Python, and/or other object-oriented, procedural, or other programming language.

The templated executable graph-based model 302 corresponds to the application specific combination of data and processing functionality which is manipulated, processed, and/or otherwise handled by the other modules within the system 300. As stated above, the structure and functionality of the data processing is separate from the data itself when offline (or at rest) and is combined dynamically at run-time. As such, different executable graph-based models are utilized for different application areas and problem domains. The skilled person will appreciate that whilst only one templated executable graph-based model 302 is shown in FIG. 3, in some embodiments a system stores and maintains more than one executable graph-based model.

All elements within the templated executable graph-based model 302 (both the data and the data processing functionality) are nodes. As will be described in more detail in relation to FIG. 4A below, a node forms the fundamental building block of all executable graph-based models. As such, the templated executable graph-based model 302 comprises one or more nodes which can be dynamically generated, extended, or processed by one or more other modules within the system 300 (e.g., by the data management module 314 and/or the overlay management module 316).

The interface module 304 provides a common interface between internal components of the system 300 and/or external sources. The interface module 304 provides an application programmable interface ("API"), scripting interface, or any other suitable mechanism for interfacing externally or internally with any module of the system 300. In the example shown in FIG. 3, the configuration 338, the context 340, the data 342, and the stimuli 344 are received by the interface module 304 of the system 300 via the network 346. Similarly, outputs produced by the system 300, such as the outcome 348, are passed by the interface module 304 to the network 346 for consumption or processing by external systems. In one embodiment, the interface module 304 supports one or more messaging patterns or protocols such as the Simple Object Access protocol (SOAP), the REST protocol, and the like. The interface module 304 thus allows the system 300 to be deployed in any number of application areas, operational environments, or architecture deployments. Although not illustrated in FIG. 3, the interface module 304 is communicatively coupled (i.e., connected either directly or indirectly) to one or more other modules or elements within the system 300 such as the controller module 306, the context module 310, the templated executable graph-based model 302 and the like. In one embodiment, the interface module 304 is communicatively coupled (i.e., connected either directly or indirectly) to one or more overlays within the templated executable graph-based model 302.

The controller module 306 handles and processes interactions and executions within the system 300. As will be described in more detail below, stimuli (and their associated contexts) provide the basis for all interactions within the templated executable graph-based model 302. Processing of such stimuli may lead to execution of processing logic associated with one or more overlays within the templated executable graph-based model 302. The processing of a stimulus within the system 300 may be referred to as a system transaction. The processing and execution of stimuli (and associated overlay execution) within the system 300 is handled by the controller module 306. The controller module 306 manages all received input stimuli (e.g., the stimuli 344) and processes them based on a corresponding context (e.g., the context 340). The context associated with a stimulus determines the priority that is assigned to processing the stimulus by the controller module 306. This allows each stimulus to be configured with a level of importance and prioritization within the system 300.

The controller module 306 maintains the integrity of the modules within the system 300 before, during, and after a system transaction. The transaction module 308, which is associated with the controller module 306, is responsible for maintaining integrity of the system 300 through the lifecycle of a transaction. Maintaining system integrity via the controller module 306 and the transaction module 308 allows a transaction to be rolled back in the event of an expected or unexpected software or hardware fault or failure. The controller module 306 is configured to handle the processing of stimuli and transactions through architectures such as parallel processing, grid computing, priority queue techniques, and the like. In one embodiment, the controller module 306 and the transaction module 308 are communicatively coupled (i.e., connected either directly or indirectly) to one or more overlays within the templated executable graph-based model 302.

As stated briefly above, the system 300 utilizes a context-driven architecture whereby a stimulus within the system 300 is associated with a context which is used to adapt the handling or processing of the stimulus by the system 300. The context module 310 manages the handling of contexts within the system 300 and is responsible for processing any received contexts (e.g., the context 340) and translating the received context to an operation execution context. In some examples, the operation execution context is larger than the received context because the context module 310 supplements the received context with further information necessary for the processing of the received context. The context module 310 passes the operational execution context to one or more other modules within the system 300 to drive the execution of the stimulus associated with the operational execution context. Contexts within the system 300 can be external or internal. While some contexts apply to all application areas and problem spaces, some applications may require specific contexts to be generated and used to process received stimuli. As will be described in more detail below, the templated executable graph-based model 302 is configurable (e.g., via the configuration 338) so as only to execute within a given execution context for a given stimulus.

The stimuli management module 312 processes externally received stimuli (e.g., the stimuli 344) and any stimuli generated internally from any module within the system 300. The stimuli management module 312 is communicatively coupled (i.e., connected either directly or indirectly) to one or more overlays within the templated executable graph-based model 302 to facilitate processing of stimuli within the templated executable graph-based model 302. The system 300 utilizes different types of stimuli such as a command (e.g., a transactional request), a query, or an event received from an external system such as an Internet-of-Things (IoT) device. As previously stated, a stimulus can be either externally or internally generated. For example, a stimulus can be an event internally triggered (generated) from any of the modules within the system 300. Such internal stimuli indicate that something has happened within the system 300 such that subsequent handling by one or more other modules within the system 300 may be required. Internal stimuli can also be triggered (generated) from execution of processing logic associated with overlays within the templated executable graph-based model 302. The stimuli management module 312 communicates and receives stimuli in real-time or near-real-time. In some examples, stimuli are scheduled in a batch process. The stimuli management module 312 utilizes any suitable synchronous or asynchronous communication architectures or approaches in communicating the stimuli (along with associated information). All stimuli within the system 300 are received and processed (along with a corresponding context) by the stimuli management module 312, which then determines the processing steps to be performed. In one embodiment, the stimuli management module 312 processes the received stimuli in accordance with a predetermined configuration (e.g., the configuration 338) or dynamically determines what processing needs to be performed based on the contexts associated with the stimuli and/or based on the state of the templated executable graph-based model 302. In some examples, processing of a stimulus results in one or more outcomes being generated (e.g., the outcome 348). Such outcomes are either handled internally by one or more modules in the system 300 or communicated via the interface module 304 as an external outcome. In one embodiment, all stimuli and corresponding outcomes are recorded for auditing and post-processing purposes (e.g., by the operations module 330 and/or the analytics module 332).

The data management module 314 manages all data or information within the system 300 (e.g., the data 342) for a given application. Operations performed by the data management module 314 include data loading, data unloading, data modelling, and data processing. The data management module 314 is communicatively coupled (i.e., connected either directly or indirectly) to one or more other modules within the system 300 to complete some or all of these operations. For example, data storage is handled in conjunction with the storage management module 320 (as described in more detail below).

The overlay management module 316 manages all overlays within the system 300. Operations performed by the overlay management module 316 includes overlay and overlay structure modelling, overlay logic creation and execution, and overlay loading and unloading (within the templated executable graph-based model 302). The overlay management module 316 is communicatively coupled (i.e., connected either directly or indirectly) to one or more other modules within the system 300 to complete some or all of these operations. For example, overlays can be persisted in some form of physical storage using the storage management module 320 (as described in more detail below). As a further example, overlays can be compiled and preloaded into memory via the memory management module 318 for faster run-time execution. The design and functionality of overlays is discussed in greater detail in relation to FIG. 4A below.

The memory management module 318 is configured to manage and optimize the memory usage of the system 300. The memory management module 318 thus helps to improve the responsiveness and efficiency of the processing performed by one or more of the modules within the system 300 by optimizing the memory handling performed by these modules. The memory management module 318 uses direct memory or some form of distributed memory management architecture (e.g., a local or remote caching solution). Additionally, or alternatively, the memory management module 318 deploys multiple different types of memory management architectures and solutions. (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 338) independently to the requirements for one or more of modules of the system 300. For example, data priority and an eviction strategy, such as least-frequently-used ("LFU") or least-recently-used ("LRU"), can be configured for all or parts of the templated executable graph-based model 302. In one embodiment, the memory management module 318 is communicatively coupled (i.e., connected either directly or indirectly) to one or more overlays within the templated executable graph-based model 302.

The storage management module 320 manages the temporary or permanent storage of data within the system 300. The storage management module 320 is any suitable low-level storage device solution (such as a file system) or any suitable high-level storage technology such as another database technology (e.g., relational database management system (RDBMS) or NoSQL database). The storage management module 320 is directly connected to the storage device upon which the relevant data is persistently stored. For example, the storage management module 320 can directly address the computer readable medium (e.g., hard disk drive, external disk drive, or the like) upon which the data is being read or written. Alternatively, the storage management module 320 is connected to the storage device via a network such as the network 346 shown in FIG. 3. The storage management module 320 uses "manifests" to manage the interactions between the storage device and the modules within the system 300. In one embodiment, the storage management module 320 is communicatively coupled (i.e., connected either directly or indirectly) to one or more overlays within the templated executable graph-based model 302.

The security module 322 manages the security of the system 300. This includes the security at a system level and at a module level. Security is hardware related, network related, or software related, depending on the operational environment, the architecture of the deployment, or the data and information contained within the system 300. For example, if the system is deployed with a web-accessible API (as described above in relation to the interface module 304), then the security module 322 can enforce a hypertext transfer protocol secure (HTTPS) protocol with the necessary certification. As a further example, if the data or information received or processed by the system 300 contains Personally Identifiable Information (PII) or Protected Health Information (PHI), then the security module 322 can implement one or more layers of data protection to ensure that the PII or PHI are correctly processed and stored. In an additional example, in implementations whereby the system 300 operates on United States of America citizen medical data, the security module 322 can enforce additional protections or policies as defined by the United States Health Insurance Portability and Accountability Act (HIPAA). Similarly, if the system 300 is deployed in the European Union (EU), the security module 322 can enforce additional protections or policies to ensure that the data processed and maintained by the system 300 complies with the General Data Protection Regulation ("GDPR"). In one embodiment, the security module 322 is communicatively coupled (i.e., connected either directly or indirectly) to one or more overlays within the templated executable graph-based model 302 thereby directly connecting security execution to the data/information in the templated executable graph-based model 302. The security module 322 thus acts as a centralized coordinator working in conjunction with the data management module 314 and overlay management module 316 for managing and executing security-based overlays.

The visualization module 324 and the interaction module 326 facilitate display and interaction of the templated executable graph-based model 302 and other parts of the system 300. As described in more detail below in relation to FIGS. 8A-8C, the visualization module 324 provides one or more displays, or visualizations, of the templated executable graph-based model 302 for review by a user of the system 300, whilst the interaction module 326 processes user interactions (e.g., inputs, commands, etc.) with the displays, or visualizations, and/or any other module within the system 300. The visualization module 324 and the interaction module 326 provide complex interactions capabilities such as standard two- and three-dimensional device interactions using a personal computer or mobile device and their attachable peripherals (e.g., keyboard, mouse, screen, etc.). Additionally, or alternatively, visualization module 324 and the interaction module 326 provide more advanced multi-dimensional user and visualization experiences such as virtual reality ("VR") or augmented reality ("AR") solutions. In one embodiment, the visualization module 324 and the interaction module 326 are communicatively coupled (i.e., connected either directly or indirectly) to one or more overlays within the templated executable graph-based model 302.

The administration module 328 manages all configurable aspects of the system 300 and the associated modules therein. Configuration is either directly embedded within the modules of the system 300 (for example, via hardware, bios, or other systems settings that are preset in the manufacturing process or software development and installation processes) or provided as dynamic configurations (e.g., via the configuration 338). Such dynamic configurations are controllable and changeable by an end-user with the appropriate administrative privileges. In one embodiment, the degree of administrative privileges associated with an end-user are contained within a received context (e.g., the context 340). Here, the end-user is a person connected to the administration module 328 via the interface module 304 or a system user directly connected to the administration module 328. In one embodiment, the administration module 328 provides read-only access to all configuration settings or allows some (or all) of the configuration settings to be changed by specific user groups defined in the administration module 328 (e.g., all users associated with a user group having sufficient access privileges). In embodiments where configurations are pre-set or predetermined, the administration module 328 provides capabilities to reset or return the system 300 to its initial state or "factory settings". In one embodiment, the administration module 328 is communicatively coupled (i.e., connected either directly or indirectly) to one or more overlays within the templated executable graph-based model 302.

The operations module 330 tracks operational metrics, module behavior, and the system 300. Operational metrics tracked by the operations module 330 include the running status of each module, the operating performance of transactions performed, and any other associated metrics to help determine the compliance of the entire system, or any module thereof, in relation to non-functional requirements. In one embodiment, the operations module 330 is communicatively coupled (i.e., connected either directly or indirectly) to one or more overlays within the templated executable graph-based model 302.

The analytics module 332 performs any analytical processing required by the modules within the system 300. The analytics module 332 processes any data embedded, or overlay contained, within the templated executable graph-based model 302 or created separately by the system 300 (e.g., the operation metrics produced by the operations module 330). As such, the analytics module 332 is communicatively coupled (i.e., connected either directly or indirectly) to one or more nodes and/or one or more overlays within the templated executable graph-based model 302.

The templating module 334 performs operations in relation to template-driven generation of executable graph-based models. For example, the templating module 334 is used to generate specific instances of nodes from templates. That is, the templating module 334 ensures ontology integrity by enforcing the structure and rules of a template when generating instances of the template at run-time. As such, the templating module 334 is communicatively coupled (i.e., connected either directly or indirectly) to one or more nodes and/or one or more overlays within the templated executable graph-based model 302.

The ownership management module 336 manages the processing of received stimuli using ownership overlays in the overlay structure of the templated executable graph-based model 302. As will be described in more detail below, ownership overlays cover four broad areas: data/information structure ownership; data/information ownership; process ownership; and process data/information ownership. As such, the ownership management module 336 is communicatively coupled (i.e., connected either directly or indirectly) to one or more nodes and/or one or more overlays within the templated executable graph-based model 302.

Having now described the system 300 for executing and managing template-drive executable graph-based models, the description will now turn to the management of ownership within a templated executable graph-based model; specifically, the concept of templates, instances, and ownership overlays.

Figure 4A:
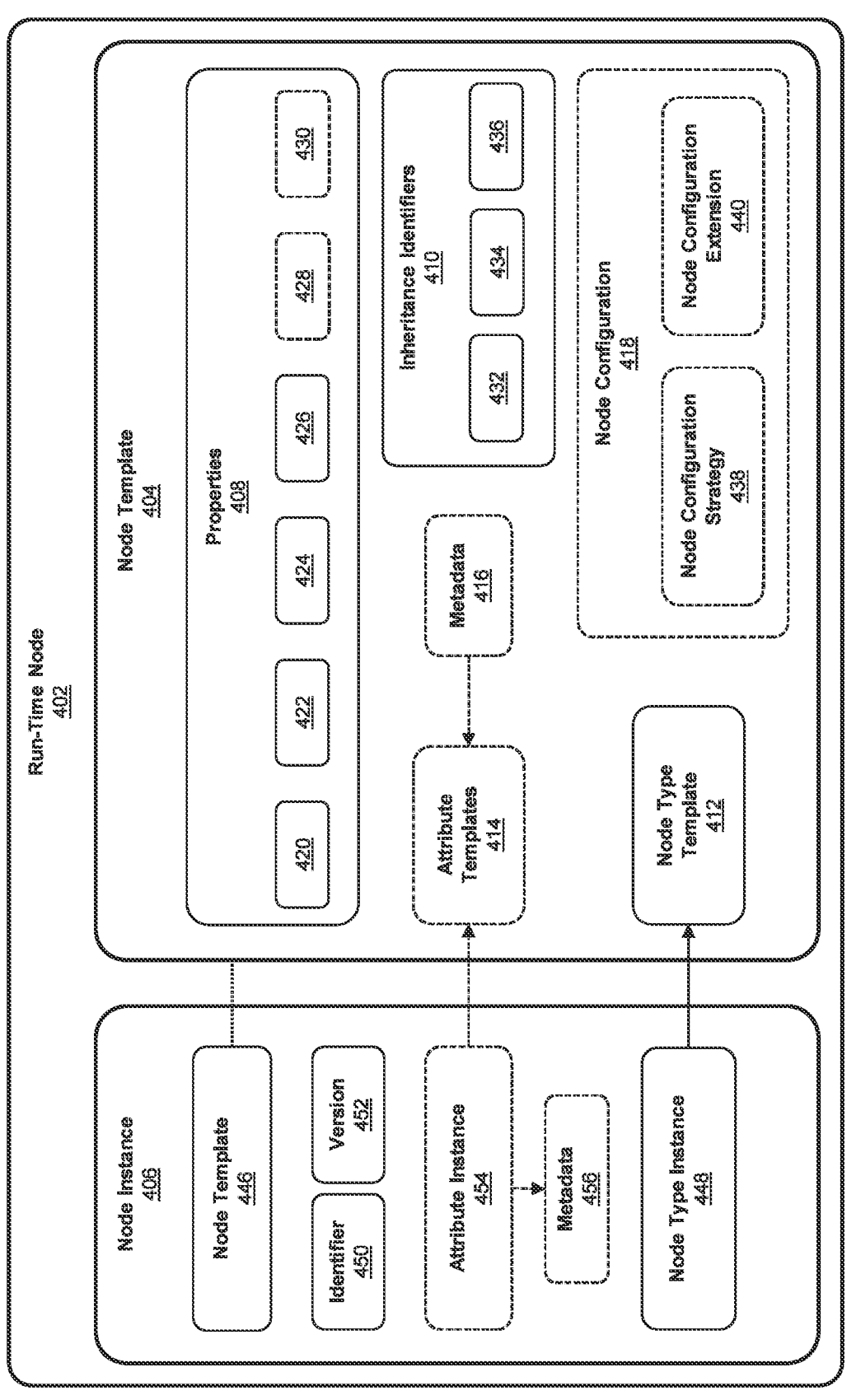
FIG. 4A shows the general structure of a run-time node according to an aspect of the present disclosure.

FIG. 4A shows the general structure of a run-time node 402 according to an aspect of the present disclosure.

The run-time node 402 comprises a composition of a node template 404 and a node instance 406 generated according to the node template 404. The run-time node 402 shown in FIG. 4A is a compositional structure which is generated, and executed, at run-time as part of a templated (template-based or template-driven) executable graph-based model (e.g., the templated executable graph-based model 302 shown in FIG. 3). That is, whilst the node template 404 is defined "offline", the node instance 406 and run-time node 402 are run-time structures which are dynamically generated during execution of a templated executable graph-based model.

The node template 404 comprises properties 408, inheritance identifiers 410, and node type template 412. The node template 404 optionally comprises attribute templates 414, metadata 416, and a node configuration 418. The properties 408 of the node template 404 include a unique identifier 420, a version identifier 422, a namespace 424, and a name 426. The properties 408 optionally include one or more icons 428 and one or more labels 430. The inheritance identifiers 410 of the node template 404 comprise an abstract flag 432, a leaf flag 434, and a root flag 436. The node configuration 418 optionally comprises one or more node configuration strategies 438 and one or more node configuration extensions 440. The node instance 406 comprises a node template

446 and a node type instance 448. The node instance 406 also comprises properties including a unique identifier 450 and a version identifier 452. The node instance 406 optionally comprises attribute instances 454 and metadata 456.

The node template 404 and the node instance 406 form the foundation for all objects within a template-driven executable graph-based model. The node template 404 defines all the structural and behavioral aspects of an ontology. That is, the node template 404 defines what is allowed for the run-time node 402 when generated as part of an executable graph-based model. The node template 404 may thus be considered to comprise a predetermined node structure and define one or more rules which govern generation of node instances which are based on the node template 404. The node instance 406 is the actual instance implementation of the node template 404 (and its corresponding definitions) for the run-time node 402. That is, the node instance 406 is generated according to the predetermined node structure and one or more rules of the node template 404. Every node instance is associated with a node template; but a node template need not be associated with a node instance. As shown in FIG. 4A, the node instance 406 is associated with a single node template (i.e., the node template 404), but the node template 404 may be associated with zero or more node instances. The node template 404 is mutable in the context of template management (e.g., when part of an "offline" graph-based model or structure) but is immutable (read only) when used as part of the run-time node 402 during execution—i.e., during execution, only the node instance 406 of the run-time node 402 may be modified. The run-time node 402 may be represented as a façade which encapsulates the data and capabilities of the node template 404 and the node instance 406 and delegates responsibilities accordingly. That is, the run-time node 402 does not contain any data, and does not perform any of the capabilities, directly.

The unique identifier 420 is unique for each node template within an executable graph-based model. Similarly, the unique identifier 450 is unique for each node instance within an executable graph-based model. That is, a node instance does not share the identifier of its associated node template. The unique identifier 420 and the unique identifier 450 are used to register, manage, and reference the node template 404 and the node instance 406 within the system (e.g., the system 300 of FIG. 3). The version identifier 422 of the node template 404 is incremented when the node template 404 undergoes transactional change. Similarly, the version identifier 452 of the node instance 406 is incremented when the node instance 406 undergoes transitional change. This allows the historical changes between versions of the node template 404 and/or the node instance 406 to be tracked by modules or overlays within the system. The namespace 424 of the node template 404, along with the name 426 of the node template 404, is used to help organize node templates within the executable graph-based model. That is, the node template 404 is assigned a unique name 426 within the namespace 424 such that the name 426 of the node template 404 need not be unique within the entire executable graph-based model, only within the context of the namespace 424 to which the node template 404 is assigned.

The node template 404 optionally comprises one or more icons 428 which are used to provide a visual representation of the node template 404 when visualized (e.g., by the visualization module 324 of the system 300 shown in FIG. 3). The one or more icons 428 can include icons at different resolutions and display contexts such that the visualization of the node is adapted to different display settings and contexts. The node template 404 also optionally comprises one or more labels 430 which are used to override the name 426 when the node template is rendered or visualized.

The node template 404 supports the software development feature of multiple inheritance by maintaining references (not shown) to zero or more other node templates, which then act as the base of the node template 404. This allows the behavior and functionality of a node template to be extended or derived from one or more other node templates within an executable graph-based model. The node instance 406 likewise supports multiple inheritance because it is an instance representation of the node template 404. The multiple inheritance structure of the node instance 406 is, however, limited to the corresponding instance realization of the multiple inheritance structure defined by the node template 404—i.e., one node instance is created and managed for each node template defined in the inheritance hierarchy for a node instance of a node template. The inheritance identifiers 410 of the node template 404 provide an indication of the inheritance-based information, which is applicable, or can be applicable, to the node template 404. The inheritance identifiers 410 comprise a set of Boolean flags which identify the inheritance structure of the node template 404. The abstract flag 432 of the inheritance identifiers 410 allows the node template 404 to support the construct of abstraction. When the abstract flag 432 takes a value of "true", the node template 404 is flagged as abstract meaning that it cannot be instantiated or created within an executable graph-based model. Thus, a node template having the abstract flag 432 set to "true" can only form the foundation of another node template that inherits from it. By default, the abstract flag 432 of a node template is set to "false". The leaf flag 434 of the inheritance identifiers 410 is used to indicate whether any other node template can inherit from the node template 404. If the leaf flag 434 is set to "true", then no other node template can inherit from the node template 404 (but unlike an abstract node, a node template with a leaf flag set can still be instantiated and created within an executable graph-based model). The root flag 436 of the inheritance identifiers 410 is used to indicate whether the node template 404 inherits from any other node template. If the root flag 436 is set to "true", then the node template 404 does not inherit from any other node template. The node template 404 is flagged as leaf (i.e., the leaf flag 434 is set to "true") and/or root (i.e., the root flag 436 is set to "true"), or neither (i.e., both the leaf flag 434 and the root flag 436 are set to "false"). The skilled person will appreciate that a node template cannot be flagged as both abstract and leaf (i.e., the abstract flag 432 cannot be set to "true" whilst the leaf flag 434 is set to "true").

All elements of a templated executable graph-based model are defined as nodes—node templates or node instances. This functionality is in part realized due to the use of a node type. In general, a node type imbues a node template/instance with common data structures and/or functionality such that all node templates/instances having that node type share the common data structures and/or functionality. A node type comprises two components: a node type template (e.g., the node type template 412) and a corresponding node type instance (e.g., the node type instance 448), which is an implementation of the node type template. This enables multiple implementations of a template's core structure and functionality to be realized. Each node template comprises a single node type template. Similarly, each node instance comprises a single node type instance associated with a node type template. That is, a node type instance, associated with a node instance, is associated with a node type template of a node template for the node instance.

The node type template 412 of the node template 404 is used to extend the functionality of the node template 404 by defining the standard set of capabilities, including data and associated behavior, for the specialized node type it will represent. For example, a node type template associated with a data node type will define the standard capabilities for the node template (and corresponding node instance) which take this node type. The node type instance 448 is an instance of the node type template 412 definition and holds any instance data or instance specific behavior. Example node types include a data node type, a value node type, and an overlay node type which is used to extend the functionality of a node to incorporate default data-oriented processing logic. As will be described in more detail below in relation to FIGS. 5A and 5B, the present disclosure describes a further class of overlays-ownership overlays-which are used to define various ownership boundaries within a templated executable graph-based model.

The attribute templates 414 correspond to the data defined by the node template 404. For example, the attribute templates 414 may define the names and value types (e.g., integer, string, float, etc.) of one or more attributes but not the values of these attributes. The values of the attribute templates 414 may be defined by the attribute instances 454 of the node instance 406 through one or more values or instance values. For example, a node template may define a string attribute "surname" and a corresponding node instance may assign the instance value "Bell-Richards" to this string attribute. Each attribute instance is associated with an attribute template. The node template 404 may define one or more default values for the attribute templates 414. The default values correspond to the values that the attributes take if no value is assigned. The node template 404 also optionally comprises metadata 416 (e.g., data stored as a name, value type, and value triplet) which is associated with either the node template 404 or one or more of the attribute templates 414 of the node template 404. Similarly, the node instance 406 also optionally comprises metadata 456 (e.g., data stored as a name, value type, and value triplet) which is associated with either the node instance 406 or one or more of the attribute instances 454.

The node configuration 418 provides a high degree of configurability for the different elements of a node template and/or a node instance. The node configuration 418 optionally comprises one or more node configuration strategies 438 and/or one or more node configuration extensions 440. An example of a concrete node configuration strategy is an identifier strategy, associated with the configuration of the unique identifier 420 of the node template 404 and/or the configuration of the unique identifier 450 of the node instance 406, which creates Snowflake identifiers. A further example of a concrete node configuration strategy is a versioning strategy, associated with the configuration of the version identifier 422 of the node template 404 and/or the version identifier 452 of the node instance 406, which supports major and minor versioning (depending on the type of transactional change incurred).

According to an aspect of the present disclosure, the structure and functionality of the run-time node 402, the node template 404, and/or the node instance 406 can be dynamically extended using the concept of overlays to generate executable nodes—i.e., executable run-time nodes, executable node templates, and executable node instances. As described in relation to FIGS. 4B-4D below, executable nodes provide processing functionality (i.e., processing logic) for a base node, such as a run-time node, a node template, or a node instance, via one or more associated overlays.

Figure 4B:
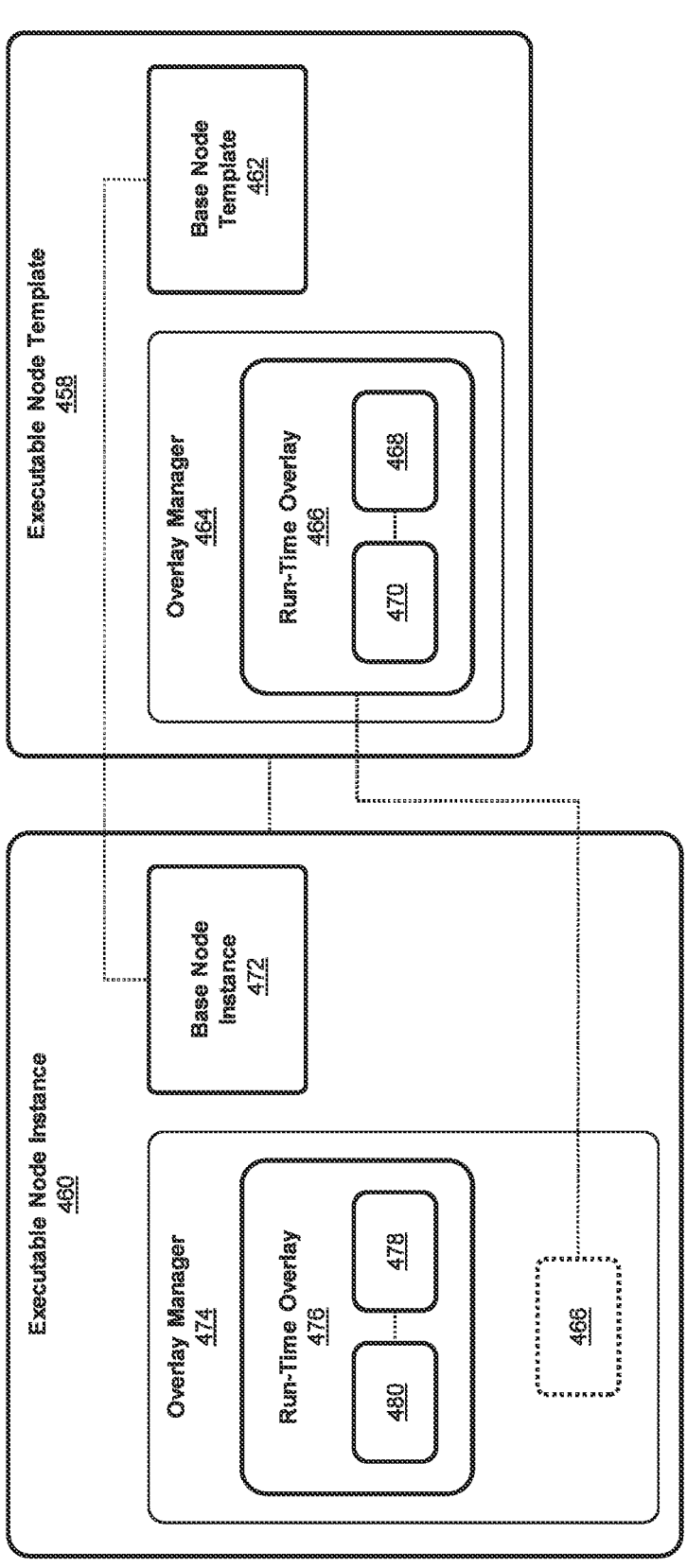
FIG. 4B shows an executable node template and an executable node instance according to an aspect of the present disclosure.

FIG. 4B shows an executable node template 458 and an executable node instance 460 according to an aspect of the present disclosure.

The executable node template 458 comprises a base node template 462 and an overlay manager 464. The overlay manager 464 maintains one or more run-time overlays such as the first run-time overlay 466 which comprises a first overlay template 468 and a first overlay instance 470. The executable node instance 460 comprises a base node instance 472 and an overlay manager 474. The overlay manager 474 maintains one or more run-time overlays such as the second run-time overlay 476 which comprises the second overlay template 478 and the second overlay instance 480. In the example shown in FIG. 4B, the base node template 462 is the proprietor of the second overlay template 478 (the skilled person will appreciate that this relation exists but is not shown in FIG. 4B for brevity). For the avoidance of doubt, the concept of proprietorship within the context of template ownership is not the same as the concept of ownership within a multi-ownership graph-based model as described in relation to FIGS. 5A and 5B below.

The executable node instance 460 is associated with (i.e., is an instance of) the executable node template 458 and the base node instance 472 is associated with (i.e., is an instance of) the base node template 462. These relationships are indicated by the dashed connecting lines in FIG. 4B. Moreover, the overlay manager 474 of the executable node instance 460 maintains a reference to the first run-time overlay 466 associated with the executable node template 458, if the executable node template 458 acts on instance information contained in the executable node instance 460. For example, the executable node template 458 may be an encryption overlay with the encryption defined by the first overlay template 468 and with specified encryption settings defined by the first overlay instance 470. In such an example, the first run-time overlay 466 is applied to the processing of attribute instances associated to the base node instance 472. Alternatively, if the first run-time overlay 466 acts only on the base node template 462 structure (void of a corresponding instance) then there is no need for the overlay manager 474 to hold a reference to the first run-time overlay 466.

The executable node template 458 and the executable node instance 460 dynamically extend the functionality of the base node template 462 and the base node instance 472 by associating the run-time overlays registered with the respective overlay managers with the base nodes (i.e., the base node template 462 and the base node instance 472). As will be described in more detail below, a run-time overlay is used to extend the functionality of a node to incorporate processing logic defined within the run-time overlay. Thus, the first run-time overlay 466 extends the functionality of the base node template 462 by incorporating processing logic, defined within the first run-time overlay 466, such that the processing logic interacts with the base node template 462 at run-time (e.g., for template building or processing performed outside of an associated node instance). Similarly, the second run-time overlay 476 extends the functionality of the base node instance 472 by incorporating processing logic, defined within the second run-time overlay 476, such that the processing logic interacts with the base node instance 472 and/or the base node template 462 at run-time. Here, processing logic corresponds to any suitable executable or interpretable code or software component. The processing logic may be expressed in a variety of software languages such as C, C++, Java, Ruby, Visual Basic, Python, and/or other object-oriented, procedural, or other programming language.

The executable node template 458 and the executable node instance 460 are dynamic structures which are generated during execution of a templated executable graph-based model. During execution, an overlay manager connected to an executable node template or instance is operable to receive and process stimuli (e.g., messages or events sent from other components within the system) and trigger the processing logic of one or more run-time overlays maintained by the overlay manager. The overlay manager of an executable node template handles template only stimuli or requests, whilst the overlay manager of an executable node instance handles instance only stimuli or requests.

The executable node template 458 may comprise one or more run-time overlays which are associated only with the base node template 462 and are not used or loaded for instance processing (i.e., they are not used or loaded with respect to the base node instance 472). As such, the overlay manager 464 may comprise a run-time overlay (not shown) which is not referenced by the overlay manager 474 of the executable node instance 460 but is used in the construction of the template definition. For example, the run-time overlay may be a validation overlay used to ensure that the base node template 462 is validly generated.

Each run-time overlay is itself a run-time node composed of a node template and a node instance which have an overlay node type. An overlay template is a node template having an overlay node type template and an overlay instance is a node instance which corresponds to a specific implementation of the overlay template (e.g., within the context of the run-time node 402 of FIG. 4A, the node type template 412 of the node template 404 is an overlay type template and the node type instance 448 of the node instance 406 is an implementation of the overlay type template defined by the node type template 412). The overlay template comprises one or more generic rules which may be implemented by the processing logic of the overlay instance. For example, a rule may be defined in an overlay template specifying that hashing algorithm is to be used and an overlay instance related to the overlay template provides a specific implementation of a hashing algorithm (e.g., MD5, SHA-1, SHA-2, etc.). The overlay template itself may further comprise processing logic or derive additional data maintained by the overlay instance portion. As such, the overlay node type extends a node template or instance by allowing processing logic or additional data to be defined and linked to the node template or instance.

Figure 4C:
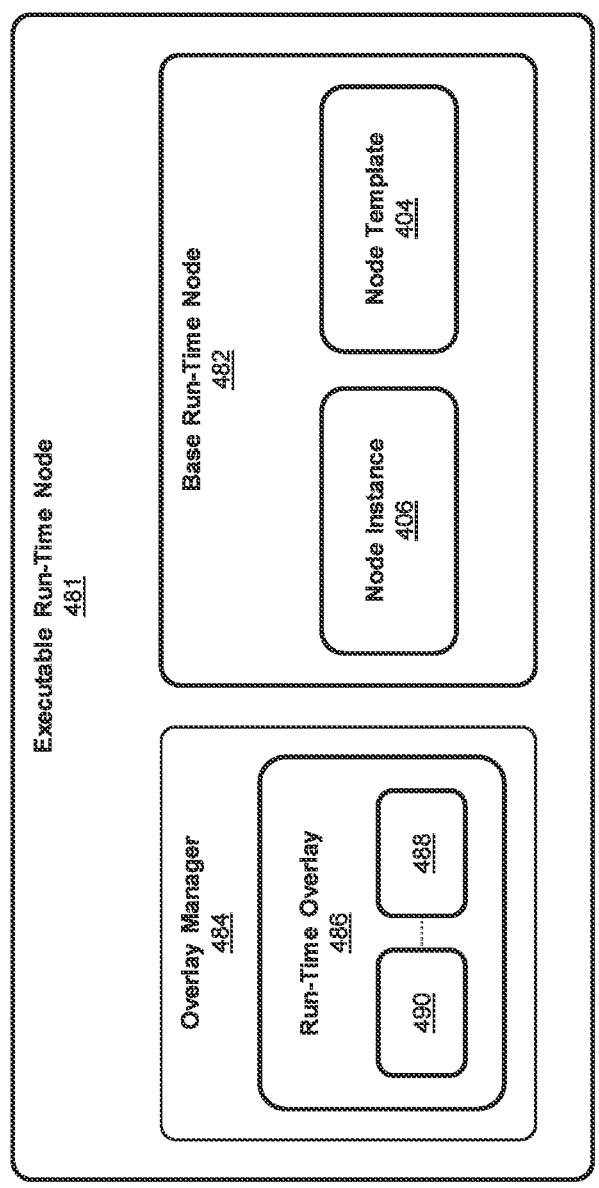
FIG. 4C shows an executable run-time node according to an aspect of the present disclosure.

FIG. 4C shows an executable run-time node 481 according to an aspect of the present disclosure.

The executable run-time node 481 comprises a base run-time node 482 and an overlay manager 484. The base run-time node 482 corresponds to the run-time node 402 shown in FIG. 4A and comprises a composition of the node template 404 and the node instance 406. The overlay manager 484 maintains one or more run-time overlays including a third run-time overlay 486 which comprises a third overlay template 488 and a third overlay instance 490.

The executable run-time node 481 is generated at run-time and dynamically extends the functionality of the base run-time node 482—i.e., the functionality of the node template 404 and/or the node instance 406—by associating the run-time overlays managed by the overlay manager 484 with the base run-time node 482. As such, the third run-time overlay 486 is operable to interact at run-time with the node template 404 and/or the node instance 406 of the base run-time node 482.

In the example shown in FIG. 4C, the node template 404 and the node instance 406 are not executable nodes. That is, neither the node template 404 nor the node instance 406 comprise an overlay manager with one or more run-time overlays. However, as described in relation to FIG. 4D below, the node template 404 and/or the node instance 406 may themselves be executable nodes thereby extending the functionality, complexity, and configurability of executable run-time nodes.

Figure 4D:
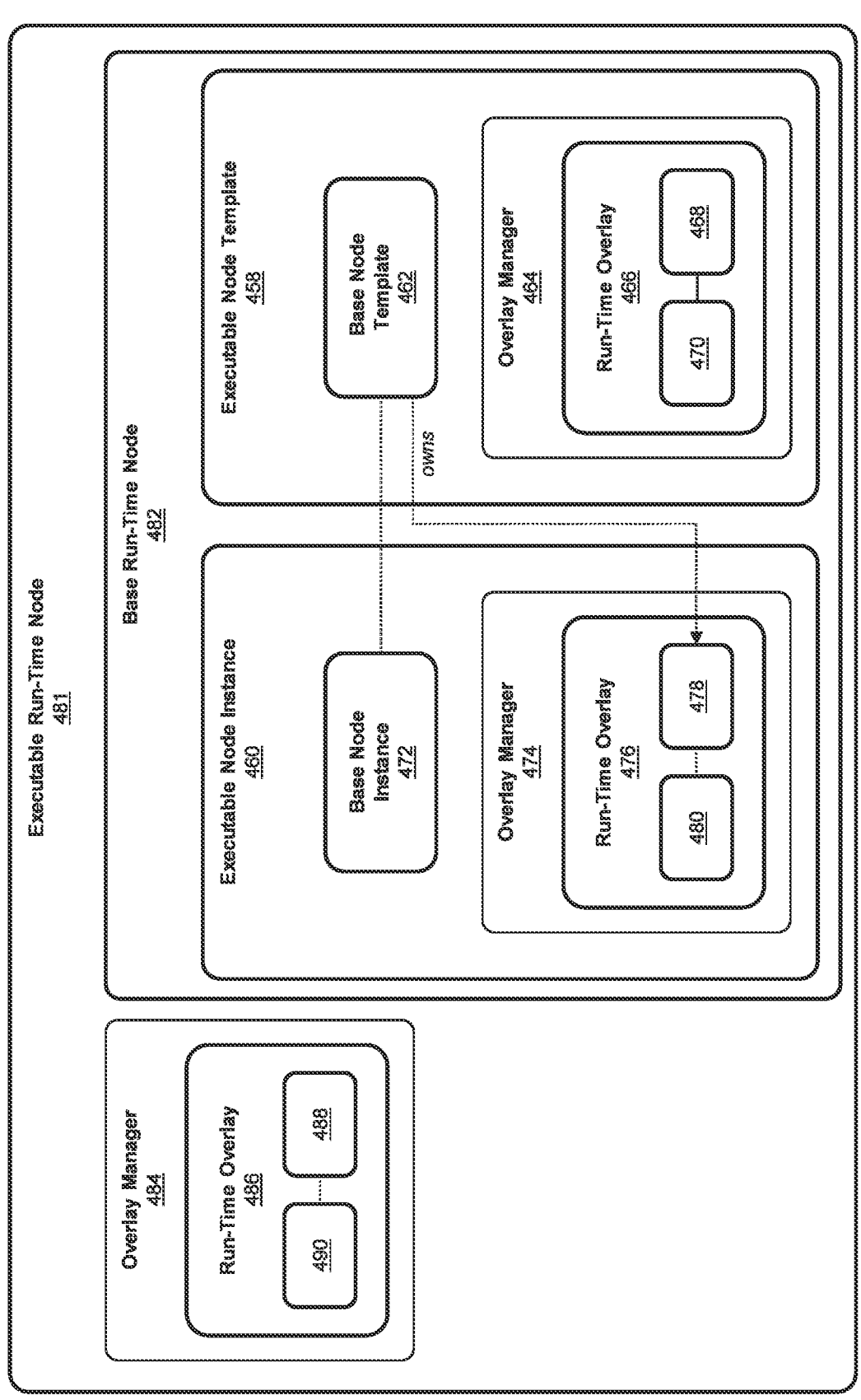
FIG. 4D shows the executable run-time node of FIG. 4C but with one or more executable nodes within the base run-time node according to an aspect of the present disclosure.

FIG. 4D shows the executable run-time node 481 of FIG. 4C but with one or more executable nodes within the base run-time node 482 according to an aspect of the present disclosure.

The executable run-time node 481 comprises the base run-time node 482 and the overlay manager 484 as described above in relation to FIG. 4C. However, as shown in FIG. 4D, the base run-time node 482 comprises a composition of the executable node template 458 and the executable node instance 460 shown in FIG. 4B. The executable run-time node 481 is generated at run-time and dynamically extends the functionality of the base run-time node 482—i.e., the functionality of the executable node template 458 and/or the executable node instance 460—by associating the run-time overlays managed by the overlay manager 484 with the base run-time node 482 (as shown in FIG. 4C).

In general, an overlay template is defined independently of a node template or a node instance and may be associated with one or more node templates or node instances (i.e., based on configuration rules as described below). The corresponding overlay instance associated to each overlay template may also be defined as being created and owned-within the context of template ownership or proprietorship as described above—by a node template or a node instance (i.e., based on configuration rules as described below). For example, an executable node template may comprise a run-time overlay which includes both an overlay template and an overlay instance (i.e., an implementation of the node template). In FIG. 4D, this is illustrated by the first run-time overlay 466 which comprises both the first overlay template 468 and the first overlay instance 470. As will be described in more detail below, the run-time overlay in such a scenario may be limited to interacting with the structure and/or data of the base node template only (e.g., the base node template 462), or may interact with the structure and/or data of the base node instance (e.g., the base node instance 472). Alternatively, a node template may be associated with an overlay template, but the node instance is implemented or associated with a node instance. That is, the run-time overlay involving the node template is generated in conjunction with the node instance. In FIG. 4D, this is illustrated by the second run-time overlay 476 which comprises the second overlay template 478 which is owned (within the context of template ownership, or proprietorship, as described above) with the base node template 462, as indicated by the dashed arrow, and the second overlay instance 480 which is associated with the base node instance 472.

As such, the construction and generation of an executable run-time node and/or an executable node template based on an overlay template may depend on the specific configuration of the overlay template. More particularly, the creation and generation may depend on ownership relations of the overlay template, scope of processing of the overlay template, and/or association restrictions of the overlay template. The skilled person will appreciate that within the following discussion, the concept of ownership refers to template ownership relations and not to multi-ownership relationships as described in relation to FIGS. 5A and 5B below.

An overlay template may be either owned or shared. If the overlay template is owned by a node template, then the overlay template may only ever be associated with the node template. That is, the overlay template may only be included as part of a run-time overlay associated with an executable node template involving the node template as the base node template. In such a scenario, the overlay template may define specific processing logic or rules associated to the definition(s) provided in the node template which owns the overlay template. If the overlay template is shared, then it can be associated to zero or more node templates or node instances. In this scenario, the node template may have generic processing logic or rules not directly tied to any node template or node instance.

An overlay template may have scope of processing limited to act in relation to the node template, the node instance, or the run-time node (i.e., both the node template and the node instance). For example, if the overlay template is limited to act in relation to the node template, then the processing logic or rules of the overlay template cannot be used to interact with an executable node instance.

An overlay template (if shared) may be restricted to be associated with only node templates, node instances, or run-time nodes (i.e., both node templates and node instances). For example, if the overlay template is restricted to the node template, then a run-time overlay comprising the overlay template cannot be associated with a node instance. Similarly, an overlay template restricted to the node instance cannot be associated with a node template.

With the above in mind, there are several configuration scenarios in relation to run-time overlays which may arise when generating executable run-time nodes. The configuration scenarios relate to the template ownership relationships, association restrictions, and processing scope of an overlay template.

A template ownership relationship (referred to below and in the figures as "owns") defines whether an overlay template is owned by a single node template or instance or may be shared by multiple node templates, instances, or is shared between node templates and node instances. As stated above, the concept of template ownership is different to the concept of multi-ownership within a graph-based model as described below in relation to FIGS. 5A and 5B. If the overlay template is owned by a first node template, then the overlay template may only be associated with the first node template. This may arise in scenarios where the overlay has specific logic associated with the definition of the node provided by the first node template. If the overlay template is shared, then the overlay template may be associated with zero or more node templates and/or node instances. That is, the overlay has generic logic which is not directly tied to any node definitions. As such, the overlay works on instance data in conjunction with any structure or default data defined by the node template. Likewise, an overlay template may be owned by an instance or shared by one or more instances. In which case the overlay template is not associated to any node template.

An association restriction (referred to below and in the figures as "restriction") defines whether a shared overlay template is associated with node templates, node instances, or both node templates and node instances. If a shared overlay template has an association restriction related to the template portion (represented as "restriction: template"), then the overlay template may only be associated with zero or more node templates. The skilled person will appreciate that an overlay template which is owned by a respective node template has an association restriction limited to the respective node template. That is, a template-owned overlay template has an association restriction of [restriction: template]. If a shared overlay template has an association restriction related to the instance portion (represented as "restriction: instance"), then the overlay template may only be associated with zero or more node instances. The skilled person will appreciate that an overlay template which is owned by a respective node instance has an association restriction limited to the respective node instance. That is, an instance-owned overlay template has an association restriction of [restriction: instance]. If a shared overlay template has no association restriction (represented as "restriction: none"), then the overlay template may be associated with zero or more node templates and/or zero or more node instances.

A processing scope (referred to below and in the figures as "act") defines whether the processing performed by an overlay template acts in relation to a node template, a node instance, or both a node template and a node instance. If an overlay template has processing scope restricted to the template portion (represented as "act: template"), then the overlay template processing logic acts only in relation to the node template. For example, an audit overlay tacking changes to the node template portion. If an overlay template has processing scope restricted to the instance portion (represented as "act: instance"), then the overlay template processing logic acts only in relation to the node instance. For example, an audit overlay tacking changes to the node instance portion. If an overlay template has combined processing scope (represented as "act: combined"), then the overlay template processing logic acts only in relation to the run-time node (i.e., the composition of the node template and the node instance). For example, a validation overlay which validates an instance value of an attribute instance based on validation criteria defined by the corresponding attribute template of the node template.

The following scenarios outline the various combinations of the template ownership relationship, with association restriction, and processing scope. In one embodiment, combinations which are not listed below are prevented (e.g., by the templating module 334 shown in FIG. 3) during configuration.

In a first scenario, an overlay template is owned by a node template and has a configuration of [owned, restriction: template, act: template]. In this scenario, the overlay template may only be associated with the node template and the processing logic of the overlay template acts only in relation to the node template (e.g., the first overlay template 468 shown in FIG. 4D which is associated with the base node template 462). An overlay instance (e.g., the first overlay instance 470 shown in FIG. 4D) is created for the overlay template, and the run-time overlay (e.g., the first run-time overlay 466 shown in FIG. 4D which is composed of the first overlay template 468 and the first overlay instance 470) is registered in the overlay manager of the executable node template created from the node template (e.g., the overlay manager 464 of the executable node template 458 created from the base node template 462 shown in FIG. 4D). Since the run-time overlay only acts on the template it is not loaded for any node instances associated with the node template. In the example shown in FIG. 4D, the first run-time overlay 466 is not loaded in the overlay manager 474 of the associated executable node instance 460.

In a second scenario, an overlay template is owned by a node template and has a configuration of [owned, restriction: template, act: instance]. In this scenario, whilst the overlay template is owned by the node template (e.g., the second overlay template 478 shown in FIG. 4D is owned by the base node template 462), it is configured to act in relation to a node instance generated from the node template (e.g., the base node instance 472 shown in in FIG. 4D which is generated from the base node template 462). An overlay instance is generated from the overlay template (e.g., the second overlay instance 480 generated from the second overlay template 478 in FIG. 4D), and the overlay instance is associated to the executable node instance formed from the node instance and node template (e.g., the executable node instance 460 shown in FIG. 4D). The association of the overlay instance with the executable node instance is required since the execution of the run-time overlay (e.g., the second run-time overlay 476 shown in FIG. 4D, formed from the second overlay template 478 and the second overlay instance 480) acts on the node instance and may produce additional instance data which is directly connected to the node instance or stored within the overlay instance itself (since an overlay instance is a node instance and therefore can maintain state). A run-time node is formed between the executable node instance and node template (e.g., the base run-time node 482 shown in FIG. 4D). In this scenario, the node template is not executable since it does not contain a direct run-time overlay (as illustrated in FIG. 4D). That is the run-time overlay associated with the executable node instance portion of the run-time node requires both an aspect of the node template and node instance. The skilled person will appreciate that each node instance will have its own overlay instance pertaining to the node template and overlay template defined by the node template in which it is an instance of.

In a third scenario, an overlay template is owned by a node template and has a configuration of [owned, restriction: template, act: combined]. This scenario is similar to the second scenario described above, except that the execution of the run-time overlay associated to the executable run-time node utilizes structural information contained in both the node template and node instance.

In a fourth scenario, an overlay template is owned by a node instance and has a configuration of [owned, restriction: instance, act: instance]. In this scenario, the overlay template may only be associated with the node instance and the processing logic of the overlay template acts only in relation to the node instance. An overlay instance is created for the overlay template, and the run-time overlay (formed from the overlay template and overlay instance) is registered in the overlay manager of the executable node instance created from the node instance (acting as the base node instance). In this scenario there is no executable node template as there is no overlay template, overlay instance associated with the node template.

In a fifth scenario, an overlay template is owned by a node instance and has a configuration of [owned, restriction: instance, act: combined]. This scenario is similar to the fourth scenario, except that the execution of the run-time overlay associated to the executable run-time node instance utilizes structural information contained in both the node template and node instance.

In a sixth scenario, an overlay template is shared with one or more node templates and has a configuration of [owns: shared, restriction: template, act: template]. This scenario is similar to the first scenario, except that the node template in which the overlay template is associated does not own the overlay template definition. In this scenario the overlay template would be defined to be independent on any specific node template. The creation of the overlay instance, run-time overlay, and executable node template would remain the same.

In a seventh scenario, an overlay template is shared with one or more node templates and has a configuration of [owns: shared, restriction: template, act: instance]. This scenario is similar to the second and sixth scenarios. Firstly, the overlay template would be defined to be independent of any specific node template, while the creation of the overlay instance, run-time overlay, and executable node instance would remain the same (as defined in the second scenario). That is, a unique overlay instance and corresponding unique run-time overlay would be associated with each node instance, forming a unique executable node instance, for each node instance of the node template.

In an eighth scenario, an overlay template is shared with one or more node templates and has a configuration of [owned: shared, restriction: template, act: combined]. This scenario is similar to the third and seventh scenarios. Firstly, the overlay template would be defined to be independent of any specific node template, while the creation of the overlay instance, run-time overlay, and executable node instance would remain the same (as defined in the third scenario). That is, a unique overlay instance and corresponding unique run-time overlay would be associated with each node instance, forming a unique executable node instance, for each node instance of the node template. The execution of the run-time overlay would interact with both the node instance and node template.

In a ninth scenario, an overlay template is shared with one or more node instances and has a configuration of [owned: shared, restriction: instance, act: instance]. This scenario is similar to the fourth scenario except that the node instance in which the overlay template is associated does not own the overlay template definition. In this scenario the overlay template would be defined to be independent on any specific node instance. The creation of the overlay instance, run-time overlay, and executable node template would remain the same.

In a tenth scenario, an overlay template is shared with one or more node instances and has a configuration of [owned: shared, restriction: instance, act: combined]. This scenario is similar to the fifth and ninth scenarios. Firstly, the overlay template would be defined to be independent of any specific node instance, while the creation of the overlay instance, run-time overlay, and executable node instance would remain the same (as defined in the ninth scenario). That is, a unique overlay instance and corresponding unique run-time overlay would be associated with each node instance, forming a unique executable node instance for each node instance of the node template. The execution of the run-time overlay would interact with both the node instance and node template.

In an eleventh scenario, an overlay template is shared with zero or more node template and zero or node instance and has a configuration of [owned: shared, restriction: node, act: instance/template/combined]. This scenario is similar to the seventh and ninth scenarios. Firstly, the overlay template would be defined to be independent of any specific node template or node instance. Secondly, if the overlay template is associated with one or more node templates, then scenario seven would be applied. Alternatively, scenario nine would be applied if the overlay template was associated with one or more node instances. Finally, since the overlay template can be associated with both a node instance and node template, a single run-time node could be composed of an executable node instance and executable node template each with their own run-time overlay implementation using the shared overlay template. That is, in this scenario, both the run-time overlay associated to the executable node instance and run-time overlay associated to the executable node template would each have their own overlay instance using the same overlay template. The scope of execution of each run-time overlay would be subject to the ownership of the run-time overlay. The run-time overlay associated to the node template (forming an executable node template) would have an act restricted to template while the run-time overlay associated to the node instance (forming an executable node instance) would have an act of instance or combined. At run-time, both the run-time overlay associated to the node template and the node instance are read-only, immutable, structures which cannot be modified by any node instances. The skilled person will appreciate that these structures are mutable when being created/configured "offline".

As stated above, the present disclosure is directed to the extension of template-based executable graph-based models to incorporate multi-ownership scenarios. The skilled person will appreciate that multi-ownership scenarios are different to the template ownership scenarios described above. Multi-ownership scenarios refer to scenarios whereby different elements of a template-based executable graph-based models are owned by different entities, individuals, or processes. In such scenarios, the clear definition, and subsequent maintenance, of ownership boundaries is important in order to ensure ownership integrity before, during, and after execution of template-based executable graph-based models. To facility multi-ownership, the present disclosure extends the concepts of overlays to incorporate a special class of overlays-ownership overlays.

Figure 5A:
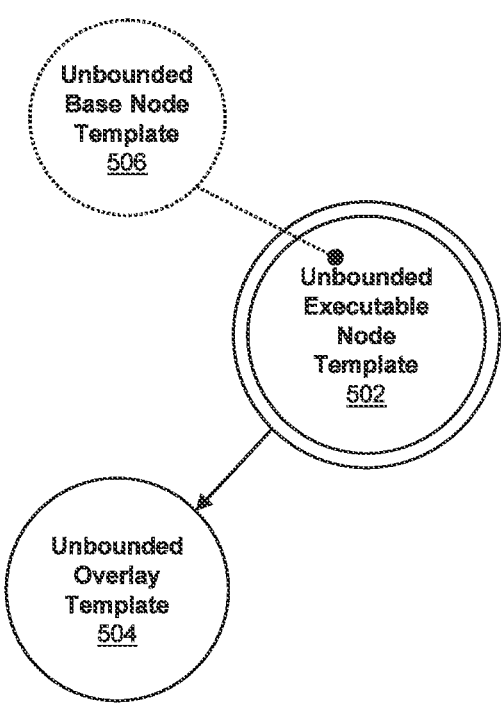
FIGS. 5A and 5B illustrates ownership overlays according to an aspect of the present disclosure.
Figure 5B:
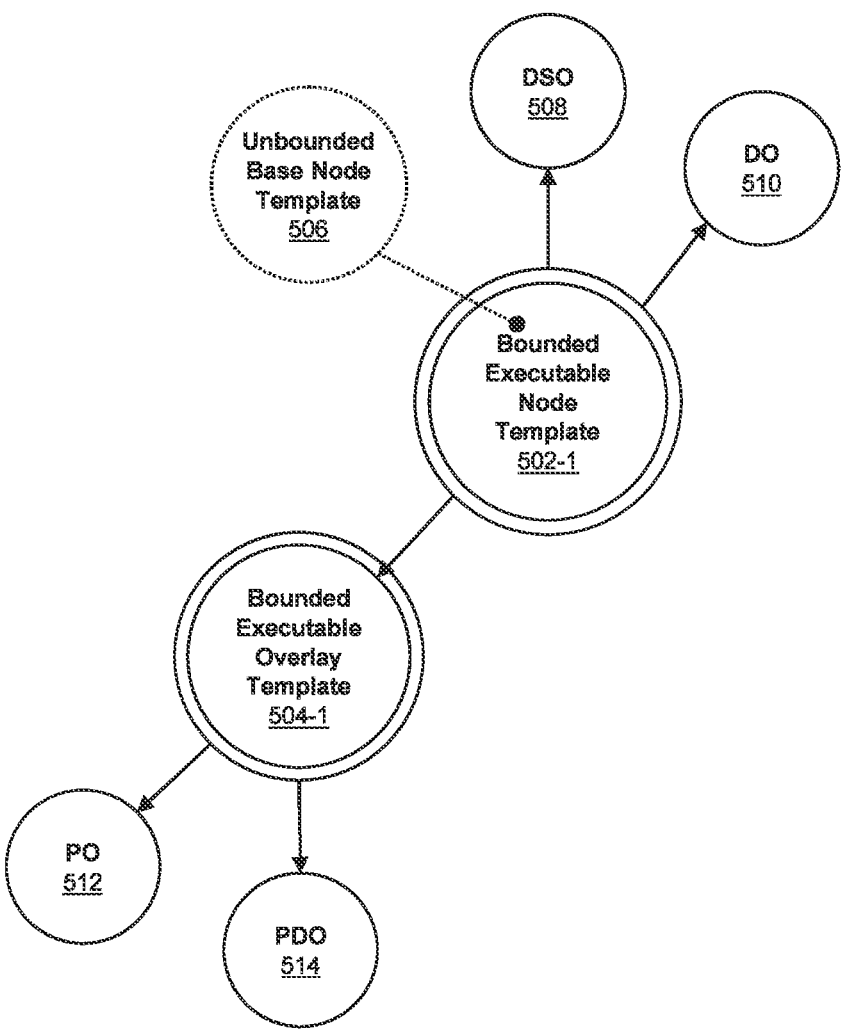

FIGS. 5A and 5B illustrate ownership overlays according to an aspect of the present disclosure.

FIG. 5A shows an unbounded executable node template 502 and an unbounded overlay template 504. The unbounded executable node template 502 comprises a base node template 506. Here, the term unbounded refers to an element of a graph-based model, such as a node template or overlay template, which does not have any ownership overlays associated therewith. This is in contrast to bounded elements (as described in more detail below) which do have one or more ownership overlays associated therewith. Throughout the following disclosure, an element of a graph-based model which is not expressly described as being bounded is considered to be unbounded.

FIG. 5B shows the overlay structure of FIG. 5A incorporating multi-ownership.

FIG. 5B shows a bounded executable node template 502-1, a bounded executable overlay template 504-1, and the unbounded base node template 506. FIG. 5B further shows a first ownership overlay 508, a second ownership overlay 510, a third ownership overlay 512, and a fourth ownership overlay 514. The bounded executable node template 502-1 and the bounded executable overlay template 504-1 correspond to the unbounded executable node template 502 and the unbounded overlay template 504 shown in FIG. 5A but with the addition of ownership overlays within their overlay structures. The bounded node template 502-1 comprises an overlay structure including the bounded executable overlay template 504-1, the first ownership overlay 508, the second ownership overlay 510. The bounded executable overlay template 504-1 comprises an overlay structure including the third ownership overlay 512 and the fourth ownership overlay 514. That is, the unbounded overlay template 504 shown in FIG. 5A becomes an executable overlay template—i.e., the bounded executable overlay template 504-1—due to the association of the overlay structure the third ownership overlay 512 and the fourth ownership overlay 514. This is in contrast with the bounded executable node template 502-1 which already comprised an overlay structure in FIG. 5A and was, thus, already an executable node.

The term "bounded" in relation to a node (e.g., a node template, executable node-template, executable run-time node, etc.) is used to indicate that the node has at least one ownership overlay within its overlay structure (i.e., registered with its overlay manager, or an overlay manager of one of its encompassing nodes). Non-ownership based overlays, or run-time overlays, may still be associated with bounded node templates and/or bounded node overlays. In such instances a bounded node template may be simply referred to as an executable node template or referred to as a bounded executable node template.

An ownership overlay (e.g., the first ownership overlay 508, the second ownership overlay 510, etc.) is a specific type of run-time overlay used to define one or more ownership rules in relation to the node template or overlay template to which it is associated. The ownership rules defined by the various ownership overlays allow for the clear identification of data structure, data, process logic, and process logic boundaries and ensures that such boundaries are maintained before, during, and after stimulus execution. Ownership overlays may be inclusive or exclusive. For example, if 90% of the ownership overlays in a graph-based model are owned by Owner A, and 10% of the ownership overlays in a graph-based model are owned by Owner B, then the ownership overlays related to Owner B may be defined as exclusive for Owner B (as opposed to identifying the 90% as inclusive of Owner A).

The first ownership overlay 508 is a data structure ownership overlay associated with the bounded node template 458-1. As such, the ownership rule defined by the first ownership overlay 508 is a data structure ownership rule which associates an owner with one or more aspects of the data structure elements of the base node template 462. Here the data structure elements include the predetermined node structure and one or more rules of the first node template (as described in more detail above in relation to FIG. 4A). Thus, when the first ownership overlay 508 is associated with a node template which, at run-time, is part of a run-time node, the first ownership overlay 508 assigns an ownership relation to the run-time node (i.e., one or more aspects of the data structure of the run-time node is deemed to be "owned" by the owner defined in the first ownership overlay 508). The first ownership overlay 508 may be associated with every template node in an executable graph-based model. That is, the first ownership overlay 508 may be associated with more than one node template. Here, the owner may be identified as part of the first ownership overlay 508 via an identifier (e.g., a unique identifier, an email address, etc.), a reference to a further node template which is associated with the owner, or any other suitable identification mechanism.

The second ownership overlay 510 is a data ownership overlay associated with the bounded node template 458-1. As such, the ownership rule defined by the second ownership overlay 510 is a data ownership rule which associates an owner with one or more data elements related to the base node template 462. Whilst a data structure ownership overlay is used to define one or more owners of the template model, the data ownership overlay is used to define one or more owners of data which is held within a node instance (and/or data held within the template model). Such data includes data associated with attribute templates and/or attribute instances (e.g., attribute templates 414 and/or attribute instances 454 shown in FIG. 4A). As an example of the distinction between data structure ownership and data ownership, a first owner may own a template-based executable graph-based model which describes a template and overlay structure which is used as an on-site digital twin for a manufacturing system offered by the first owner. The manufacturing system, and thus the template-based executable graph-based model, may be deployed across a number of sites each having a different owner. Whilst the owner of the template and overlay structure remains the first owner for all deployment sites, the data held within the template-based executable graph-based model will be specific to each deployment site and is thus owned by an owner associated with the deployment site. Data structure ownership overlays (i.e., the first ownership overlay 508) and data ownership overlays (i.e., the second ownership overlay 510) are used to define these boundaries. Here, the owner may be identified as part of the second ownership overlay 510 via an identifier (e.g., a unique identifier, an email address, etc.), a reference to a further node template which is associated with the owner, or any other suitable identification mechanism. The first ownership overlay 508 and the second ownership overlay 510 may relate to the same or different owners.

The third ownership overlay 512 is a process ownership overlay associated with the bounded overlay template 458-2 (and thus indirectly associated with the bounded node template 458-1 via the overlay structure of the bounded node template 458-1 which includes the bounded overlay template 458-2). The ownership rule defined by the third ownership overlay 512 is a process ownership rule which associates an owner with the unbounded overlay template 504. Thus, when the third ownership overlay 512 is associated with an overlay template which, at run-time, is part of a run-time overlay, the third ownership overlay 512 assigns an ownership to the run-time overlay (i.e., the run-time overlay is deemed to be "owned" by the owner defined in the third ownership overlay 512). The third ownership overlay 512 may thus be considered analogous to the first ownership overlay 508 but in relation to overlays (overlay templates, run-time overlays) as opposed to nodes (node templates). Here, the owner may be identified as part of the third ownership overlay 512 via an identifier (e.g., a unique identifier, an email address, etc.), a reference to a further node template which is associated with the owner, or any other suitable identification mechanism.

The fourth ownership overlay 514 is a process data ownership overlay associated with the bounded overlay template 458-2 (and thus indirectly associated with the bounded node template 458-1 via the overlay structure of the bounded node template 458-1 which includes the bounded overlay template 458-2). The ownership rule defined by the fourth ownership overlay 514 is a process data ownership rule which associates an owner with data generated during execution of processing logic associated with the bounded overlay template 458-2. That is, if the bounded overlay template 458-2, at run-time, forms a part of a run-time overlay, then the fourth ownership overlay 514 defines the owner of any data generated when the processing logic of the run-time overlay is executed. As in the manufacturing system example described above, the owner of the overlay structure may differ from the entity (e.g., person, business, etc.) which executes or runs the template-based executable graph-based model incorporating the overlay structure. Thus, process ownership overlays (i.e., the third ownership overlay 512) and process data ownership overlays (i.e., the fourth ownership overlay 514) are used to define such boundaries. Here, the owner may be identified as part of the fourth ownership overlay 514 via an identifier (e.g., a unique identifier, an email address, etc.), a reference to a further node template which is associated with the owner, or any other suitable identification mechanism. The third ownership overlay 512 and the fourth ownership overlay 514 may relate to the same or different owners. Alternatively, the first ownership overlay 508, the second ownership overlay 510, the third ownership overlay 512, and the fourth ownership overlay 514 may all relate to different owners.

As is clear from the above, a template-based executable graph-based model may be composed of elements from several different owners. The data structure—i.e., the node template structure—may be owned by a first owner, the data held within the data structure may be owned by a second owner, the processing functionality—i.e., the overlay structure—may be owned by a third owner, and the data generated during executable of the template-based executable graph-based model may be owned by a fourth owner. Each of these owners may be different and the ownership overlays described above provide an efficient mechanism for delineating the ownership boundaries, and ensuring ownership integrity, both before, during, and after execution of the template-based executable graph-based model. Maintaining boundary integrity may be particularly important to ensure that elements of a template-based executable graph-based model belonging to one owner does not fall within the ownership boundary of another owner thereby improving the security and privacy of the overall system.

Figure 6:
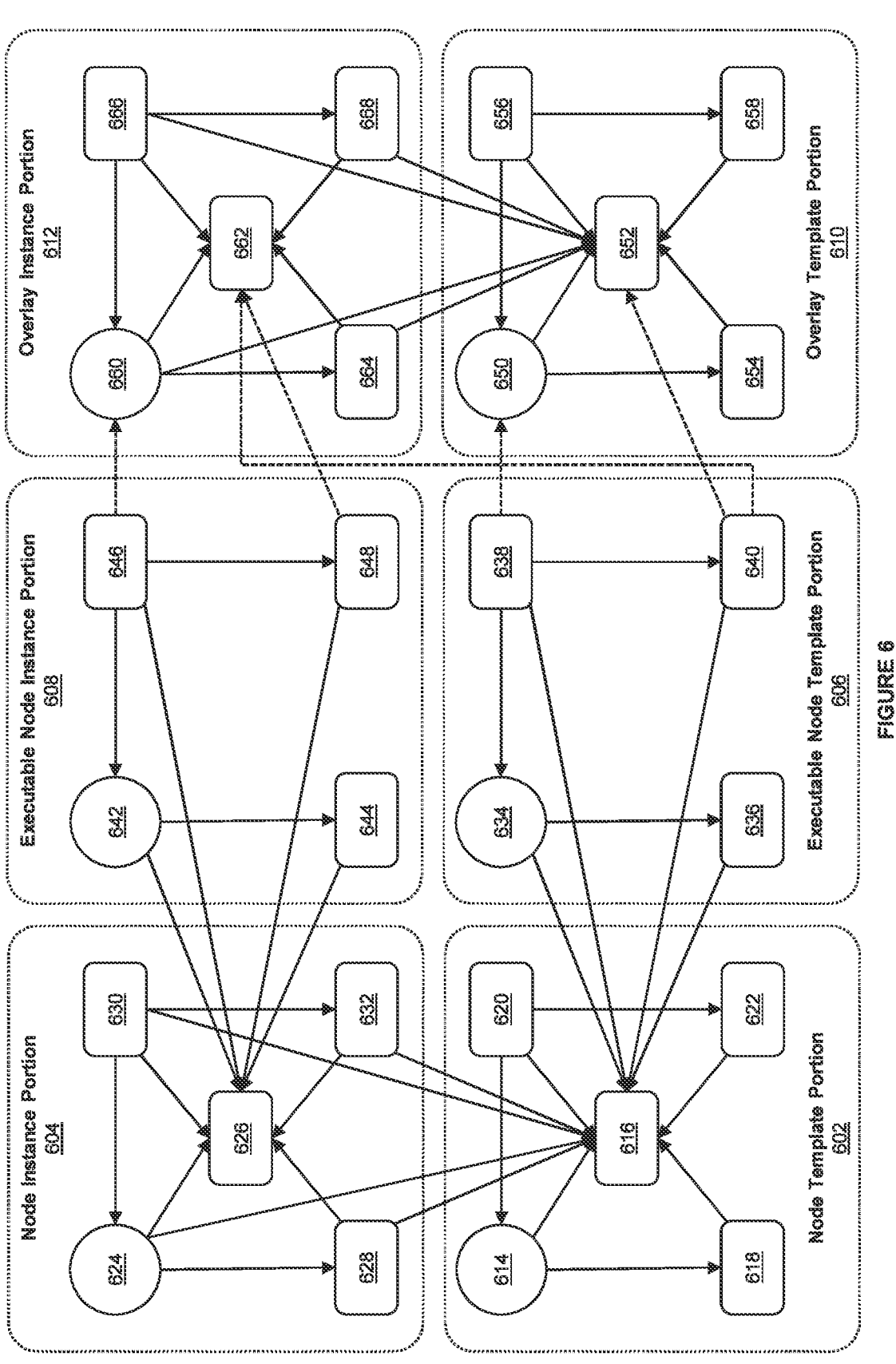
FIG. 6 shows the decomposition of an executable run-time node for storage according to an embodiment of the present disclosure.

Before describing an example of ownership within a template-based executable graph-based model, the description will turn to the decomposition of an executable run-time node for persistent storage, as shown in FIG. 6.

FIG. 6 shows the decomposition of an executable run-time node for storage according to an embodiment of the present disclosure.

FIG. 6 shows an executable run-time node (such as that having the structure shown in FIG. 4D) decomposed into a node template portion 602, a node instance portion 604, an executable node template portion 606, an executable node instance portion 608, an overlay template portion 610, and an overlay instance portion 612.

The node template portion 602 comprises a node template 614 which comprises a first unique node identifier 616 and a node template state 618. Throughout, the term "state" is used to refer to the data stored by a node template, node instance, or manifest. The node template portion 602 further comprises a node template manifest 620 generated from the node template 614 and a node template manifest state 622 generated from the node template manifest 620. Throughout, the term "manifest" is used to refer to the structure of a node template or node instance that is independent of the state (i.e., independent of the stored therein). The node template state 618, the node template manifest 620, and the node template manifest state 622 all comprise the first unique node identifier 616. The node instance portion 604 comprises a node instance 624 which comprises a second unique node identifier 626 and a node instance state 628. The node instance portion 604 further comprises a node instance manifest 630 generated from the node instance 624 and a node instance manifest state 632 generated from the node instance manifest 630. The node instance state 628, node instance manifest 630, and the node instance manifest state 632 all comprise the second unique node identifier 626.

The executable node template portion 606 comprises an executable node template 634 which comprises an executable node template state 636. The executable node template portion 606 further comprises an executable node template manifest 638 generated from the executable node template 634 and an executable node template manifest state 640 generated from the executable node template manifest 638. The executable node template 634, the executable node template state 636, the executable node template manifest 638, and the executable node template manifest state 640 all comprise the first unique node identifier 616. The executable node template portion 606 is associated with zero or more overlay template portions such that the executable node template manifest 638 comprises zero or more overlay templates (e.g., the overlay template 650) and the executable node template manifest state 640 comprises zero or more unique node identifiers associated with zero or more overlay templates (e.g., the third unique node identifier 652). The executable node instance portion 608 comprises an executable node instance 642 which comprises an executable node instance state 644. The executable node instance portion 608 further comprises an executable node instance manifest 646 generated from the executable node instance 642 and an executable node instance manifest state 648 generated from the executable node instance manifest 646. The executable node instance 642, the executable node instance state 644, the executable node instance manifest 646, and the executable node instance manifest state 648 all comprise the second unique node identifier 626. The executable node instance portion 608 is associated with zero or more overlay instance portions such that the executable node instance manifest 646 comprises zero or more overlay instances (e.g., the overlay instance 660) and the executable node instance manifest state 648 comprises zero or more unique node identifiers associated with zero or more overlay instances (e.g., the fourth unique node identifier 662).

The overlay template portion 610 comprises an overlay template 650 which comprises a third unique node identifier 652 and a fifth state 654. The overlay template portion 610 further comprises a fifth manifest 656 generated from the overlay template 650 and a fifth manifest state 658 generated from the fifth manifest 656. The fifth state 654, the fifth manifest 656, and the fifth manifest state 658 all comprise the third unique node identifier 652. The overlay instance portion 612 comprises an overlay instance 660 which comprises a fourth unique node identifier 662 and a sixth state 664. The overlay instance portion 612 further comprises a sixth manifest 666 generated from the overlay instance 660 and a sixth manifest state 668 generated from the sixth manifest 666. The sixth state 664, the sixth manifest 666, and the sixth manifest state 668 all comprise the fourth unique node identifier 662.

An executable run-time node is thus persisted to storage, and loaded from storage, by linking the node template portion 602 and the executable node template portion 606 to the same unique node identifier (i.e., the first unique node identifier 616) and by linking the node instance portion 604 and the executable node instance portion 608 to the same unique node identifier (i.e., the second unique node identifier 626). The executable node template may thus be persisted and loaded based on the first unique node identifier 616 and the executable node instance may be persisted and loaded based on the second unique node identifier 626. The executable node template portion 606 is associated with zero or more overlay template portions 610 and the executable node instance portion 608 is associated with zero or more overlay instance portions 612. Thus, when loading an executable node template or instance from storage, the associated overlay templates and/or instances are identified and loaded based on the unique node identifiers associated with the overlay templates and/or instances stored in the manifest states of the executable node template and/or instance.

Beneficially, each component is stored separately thereby allowing a user to maintain and store their data independently of the storage of the structure and functionality of the executable graph-based model.

The structure shown in FIG. 5 may be further decomposed into a plurality of sub-structures depending on ownership relationships. For example, a template may need to be composed of more than one manifest if the template data structure is owned by two or more owners. As such, the skilled person will appreciate that the manifests and states shown in FIG. 5 may be further decomposed depending on the ownership relations defined within the overlay structure of the executable graph-based model.

Having described the structure and function of template-based executable graph-based models in FIGS. 4A-4D, the definition and generation of an example template-based executable graph-based model incorporating ownership integrity will now be described to provide further understanding of the aspects described above.

Figure 7A:
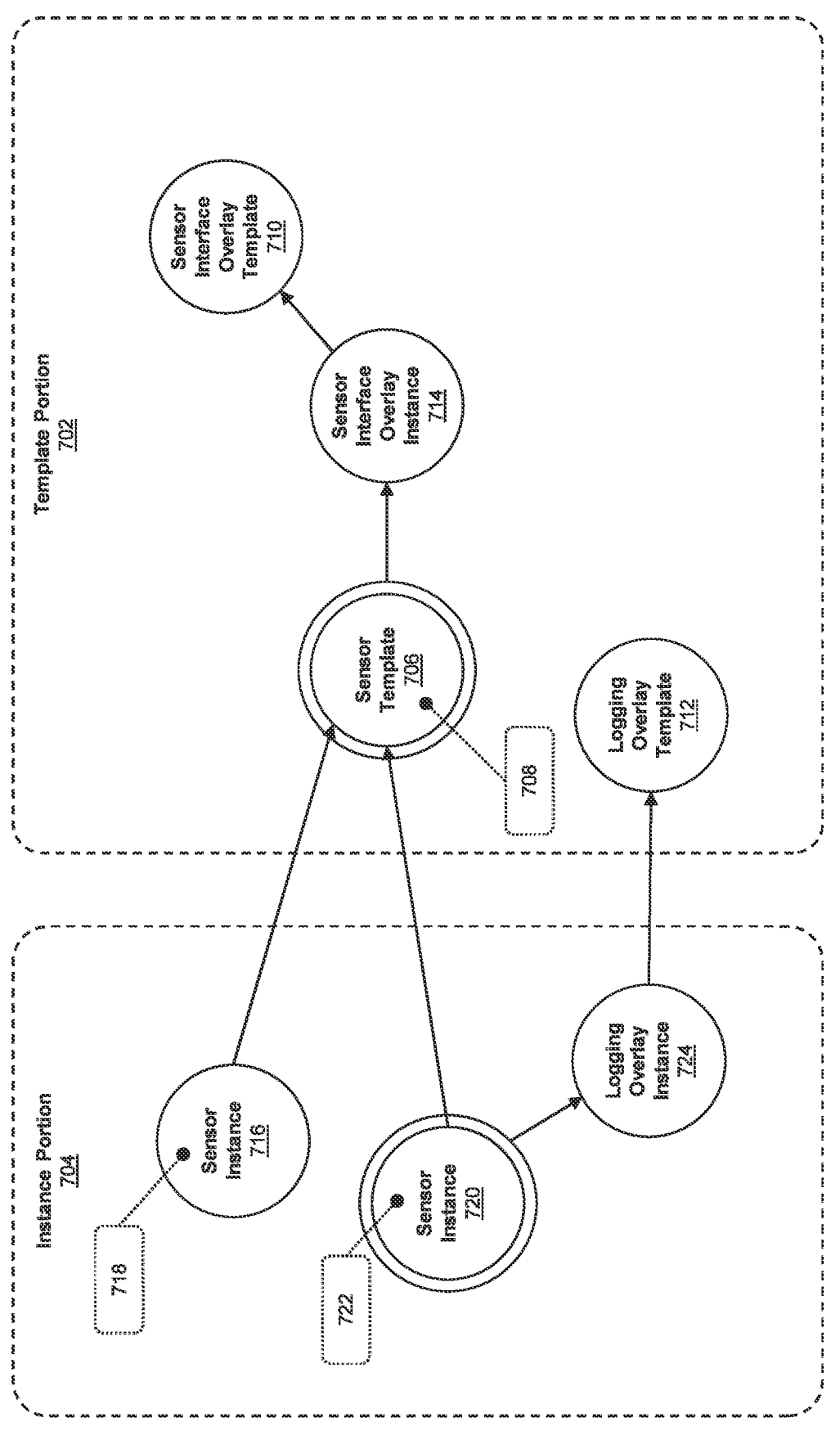
FIG. 7A illustrates a templated executable graph-based model according to an embodiment of the present disclosure.

FIG. 7A illustrates a templated executable graph-based model according to an embodiment of the present disclosure.

FIG. 7A shows a templated executable graph-based model comprising a template portion 702 and an instance portion 704. The template portion 702 comprises a first executable node template 706 comprising a set of attribute templates 708, a first overlay template 710, and a second overlay template 712. The template portion further comprises a first overlay instance 714 which is an instance of the first overlay template 710. The instance portion 704 comprises a first node instance 716 comprising a first set of attribute instances 718, a second node instance 720 which is an executable node instance comprising a second set of attribute instances 722, and a second overlay instance 724

The templated executable graph-based model shown in FIG. 7A corresponds to a portion of a soil moisture sensor system. More particularly, the templated executable graph-based model corresponds to the portion of the system related to the interface with physical soil moisture sensors. Templated executable graph-based models are well suited to such precision agriculture applications due to the reusability and extensibility of the template structure as well as the reduction in latency provided by the integration of data and data processing logic within a single model.

The first executable node template 706 corresponds to a template for a soil moisture sensor; that is, the first executable node template 706 comprises the common structure and data applicable to a specific type of soil moisture sensor (e.g., a specific model of soil moisture sensor). The first overlay template 710 and the first overlay instance 714 define processing logic operable to interface with a soil moisture sensor depending on configuration values assigned attributes defined in the first executable node template 706. The first node instance 716 and the second node instance 720 correspond to specific implementations of the first executable node template 706 and are associated with two physical soil moisture sensors placed within the real world. The two physical soil moisture sensors are of the specific type represented by the first executable node template 706. The set of attribute instances 718 of the first node instance 716 define values related to the specific soil moisture sensor associated with the first node instance 716. For example, the set of attribute templates 708 may define attributes such as unique model number, internet protocol (IP) address, and global positioning system (GPS) location; the set of attribute instances 718 of the first node instance 716 may thus specify values for these attributes which are specific to the soil moisture sensor associated with the first node instance 716. Similarly, the set of attribute instances 722 of the second node instance 720 may assign values for the set of attribute templates 708 which are specific to the soil moisture sensor associated with the second node instance 720. In this way, the processing logic defined in the first overlay template 710 and/or the first overlay instance 714 is operable to interact with the requisite sensor by utilizing the values set in the set of attribute instances 722 or the set of attribute instances 722.

The second node instance 720 is associated with the second overlay instance 724 which corresponds to a specific implementation of the second overlay template 712. The second overlay template 712 defines common structures and data for performing data logging. As is known, such logging may be achieved in several ways and for several purposes therefore being well suited to having multiple possible implementations. The second overlay instance 724 is an implementation of the second overlay template 712 which contains processing logic operable to record logging data to a distributed ledger, or blockchain. Thus, various aspects of the processing performed by the second node instance 720 (e.g., values set, values obtained, etc.) may be logged by associating the second node instance 720 with the second overlay instance 724. As can be seen in FIG. 7A, only the second overlay template 712 is defined in the template portion 702 (unlike the first overlay template 710 which has the first overlay instance 714 also defined in the template portion 702). Thus, multiple implementations of the second overlay template 712 may be achieved and assigned to nodes within the instance portion 704 (i.e., nodes within instance portion 704 are able to define their own implementation of the second overlay template 712).

When the templated executable graph-based model shown in FIG. 7A is deployed, there may be multiple owners/proprietors involved in the deployed model. For example, the data structure and processes defined by the first executable node template 706, the first overlay template 710, and the first overlay instance 714 may be owned by the manufacturer of the manufacturer of the soil moisture sensors whilst the second overlay template 712 is owned by a developer of the data logging software. Similarly, the owner of the data and process data held and generated by the first node instance 716 may be the owner of the soil moisture sensor to which the first node instance 716 relates whilst the owner of the data and process data held and generated by the second node instance 720 may be the owner of the soil moisture sensor to which the second node instance 720 relates. Ensuring that such ownership boundaries are maintained during execution of the templated executable graph-based model is important to help ensure that the integrity and security of the system is maintained both before, during, and after execution.

Figure 7B:
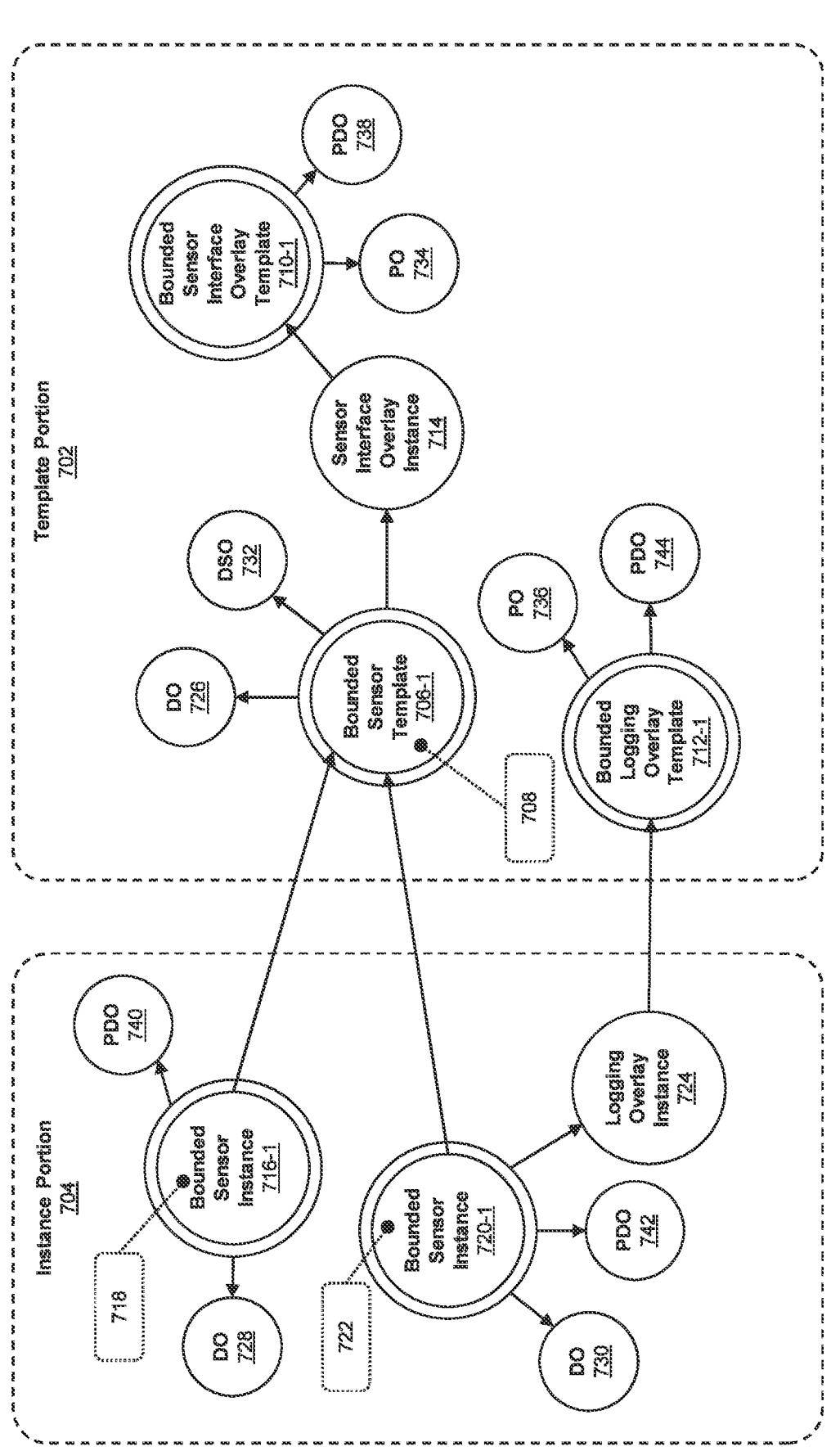
FIG. 7B shows the templated executable graph-based model shown in FIG. 7A with an accompanying ownership overlay structure according to an embodiment of the present disclosure.

FIG. 7B shows the templated executable graph-based model shown in FIG. 7A with an accompanying ownership overlay structure according to an embodiment of the present disclosure.

FIG. 7B shows an ownership overlay structure which is associated with the nodes of the templated executable graph-based model shown in FIG. 7A. The ownership overlay structure comprises a first data ownership (DO) overlay template 726, a first DO overlay instance 728, and a second DO overlay instance 730. The first DO overlay instance 728 and the second DO overlay instance 730 are both instances of the first DO overlay template 726. The ownership overlay structure further comprises a first data structure ownership (DSO) overlay 732, a first process owner (PO) overlay 734, and a second PO overlay 736. The ownership overlay structure further comprises a first process data ownership (PDO) overlay template 738, a first PDO overlay instance 740, a second PDO overlay instance 742, and a first PDO overlay 744. The first PDO overlay instance 740 and the second PDO overlay instance 742 are both instances of the first PDO overlay template 738.

The ownership overlay structure shown in FIG. 7B defines ownership boundaries relating to the data structure, data, processes, and process data of the templated executable graph-based model. During execution, the ownership overlay structure helps to ensure that the integrity and security of the model is maintained.

The first DO overlay template 726 and the first DSO overlay 732 are associated with the first executable node template 706 shown in FIG. 7A thereby generating a first bounded executable node template 706-1 as shown in FIG. 7B. The first executable node template 706 is thus the base node of the first bounded executable node template 706-1. The first DO overlay template 726 associates an owner—the manufacturer of the system which interfaces with the soil moisture sensors (who may be the same as, or different to, the manufacturer of the soil moisture sensors)—with the data held within the data structure of the first executable node template 706. The first DSO overlay 732 associates an owner with the data structure of the first executable node template 706. In this example, the owner defined by the first DSO overlay 732 is also the manufacturer of the system which interfaces with the soil moisture sensor. However, the skilled person will appreciate that the owner of the data held within the data structure of the first executable node template 706 may be different to the owner of the data structure of the first executable node template 706.

The first PO overlay 734 and the first PDO overlay template 738 are associated with the first overlay template 710 shown in FIG. 7A thereby generating a first bounded executable overlay template 710-1 as shown in FIG. 7B. The first overlay template 710 is thus the base node of the first bounded executable overlay template 710-1. The first PO overlay 734 associates an owner—the manufacturer of the system which interfaces with the soil moisture sensors—with the processing logic defined within the first overlay template 710. However, the first PO overlay 734 does not define that the manufacturer of the system owns any data generated by the first overlay template 710 during execution. The first PDO overlay template 738 associates an owner—the manufacturer of the system which interfaces with the soil moisture sensors—with the data generated during execution of the processing logic defined within the first overlay template 710.

The second PO overlay 736 and the second PDO overlay 744 are associated with the second overlay template 712 shown in FIG. 7A thereby generating a second bounded executable overlay template 712-1 as shown in FIG. 7B. The second overlay template 712 is thus the base node of the second bounded executable overlay template 712-1. Both the second PO overlay 736 and the second PDO overlay 744 associate an owner—in this instance, the developer of the logging software—with the processing logic and data generated during execution of the processing logic. In this example, the owner is the same for both the processing logic and the data generated by the processing logic during execution. The skilled person will appreciate that the second PO overlay 736 and the second PDO overlay 744 may, in other examples, associate different owners with the process logic and the generated data.

The first DO overlay instance 728 and the first PDO overlay instance 740 are associated with the first node instance 716 shown in FIG. 7A thereby generating a first bounded executable node instance 716-1 as shown in FIG. 7B. The first node instance 716 is thus the base node of the first bounded executable node instance 716-1. The first DO overlay instance 728 associates an owner—the owner of the soil moisture sensor to which the first node instance 716 relates, referred to henceforth as the first owner—with the data held within the data structure of the first node instance 716 (e.g., the set of attribute instances 718). The first PDO overlay instance 740 associates the first owner with the data generated during execution of the processing logic related to the first bounded executable node instance 716-1. As such, the first DO overlay instance 728 and the first PDO overlay instance 740 ensure that the soil moisture measurements generated by the soil moisture sensor associated with the first node instance 716 are owned by the first owner.

The second DO overlay instance 730 and the second PDO overlay instance 742 are associated with the second node instance 720 shown in FIG. 7A thereby generating a second bounded executable node instance 720-1 as shown in FIG. 7B. The second node instance 720 is thus the base node of the second bounded executable node instance 720-1. The second DO overlay instance 730 associates an owner—the owner of the soil moisture sensor to which the second node instance 720 relates, referred to henceforth as the second owner—with the data held within the data structure of the second node instance 720 (e.g., the set of attribute instances 722). The second PDO overlay instance 742 associates the second owner with the data generated during execution of the processing logic related to the second bounded executable node instance 720-1. As such, the second DO overlay instance 730 and the second PDO overlay instance 742 ensure that the soil moisture measurements generated by the soil moisture sensor associated with the second node instance 720 are owned by the first owner.

In summary, the ownership overlay structure defines the following ownership boundaries. The manufacturer of the system which interfaces with the soil moisture sensors (who may be the same as, or different to, the manufacturer of the soil moisture sensors) owns the data, data structures, processes, and process data related to the template portion of the soil moisture sensor system—i.e., the first executable node template 706 and the first overlay template 710. A first owner of a first soil moisture sensor owns the data held within the digital twin (i.e., the first node instance 716) of the first soil moisture sensor along with data generated during execution of the digital twin. A second owner of a second soil moisture sensor owns the data held within the digital twin (i.e., the second node instance 720) of the second soil moisture sensor along with data generated during execution of the digital twin. The developer of the logging software owns the processing logic and corresponding data generated by the processing logic of the logging software—i.e., the second overlay template 712.

Once generated, the templated executable graph-based model may be used to read soil moisture measurements from the two sensors (either periodically or continuously). For example, a stimulus and associated context may be received by the second bounded executable node instance 720-1. The stimulus and associated context relate to a request to obtain a soil moisture measurement from the soil moisture sensor associated with the second node instance 720. In response, and based on the associated context, the run-time overlays associated with the second node instance 720 are executed in accordance with any ownership overlay associated therewith. That is, the processing logic contained in the first overlay template 710, the first overlay instance 714, the second overlay template 712, and/or the second overlay instance 724 are caused to be executed and any data generated as a result of the execution is owned by the second owner in accordance with the second PDO overlay instance 742. Similarly, any resulting data stored within the data structure of the second node instance 720 is owned by the second owner in accordance with the second DO overlay instance 730. Execution of the processing logic also cause a log to be recorded (by the second overlay instance 724) to indicate that a request to take a measurement has been made. The data generated by this execution is owned by the developer of the logging software by virtue of the second PDO overlay 744. The processing logic of the first overlay instance 714 is executed to obtain a soil moisture measurement from the soil moisture sensor (e.g., using the IP address defined in the set of attribute instances 722 of the second node instance 720 to communicate with the soil moisture sensor). Once the measurements have been obtained, they are output as outcomes. Therefore, the ownership overlay structure shown in FIG. 7B helps to ensure that integrity of the system is maintained by controlling the ownership boundaries of the elements within the system.

The templated executable graph-based model shown in FIGS. 7A and 7B includes an ownership structure comprising multiple ownership boundaries—i.e., different owners own different parts of the templated executable graph-based model. To facilitate greater understanding of such ownership boundaries it is advantageous to have a visualization approach whereby a user is able to interact efficiently and intuitively with the ownership boundaries of a template-based executable graph-based model whilst maintaining contextual information provided by the node and overlay structures.

FIGS. 8A-8D illustrate the visualization of ownership and ownership boundaries within templated executable graph-based models according to an embodiment of the present disclosure.

Figure 8A:
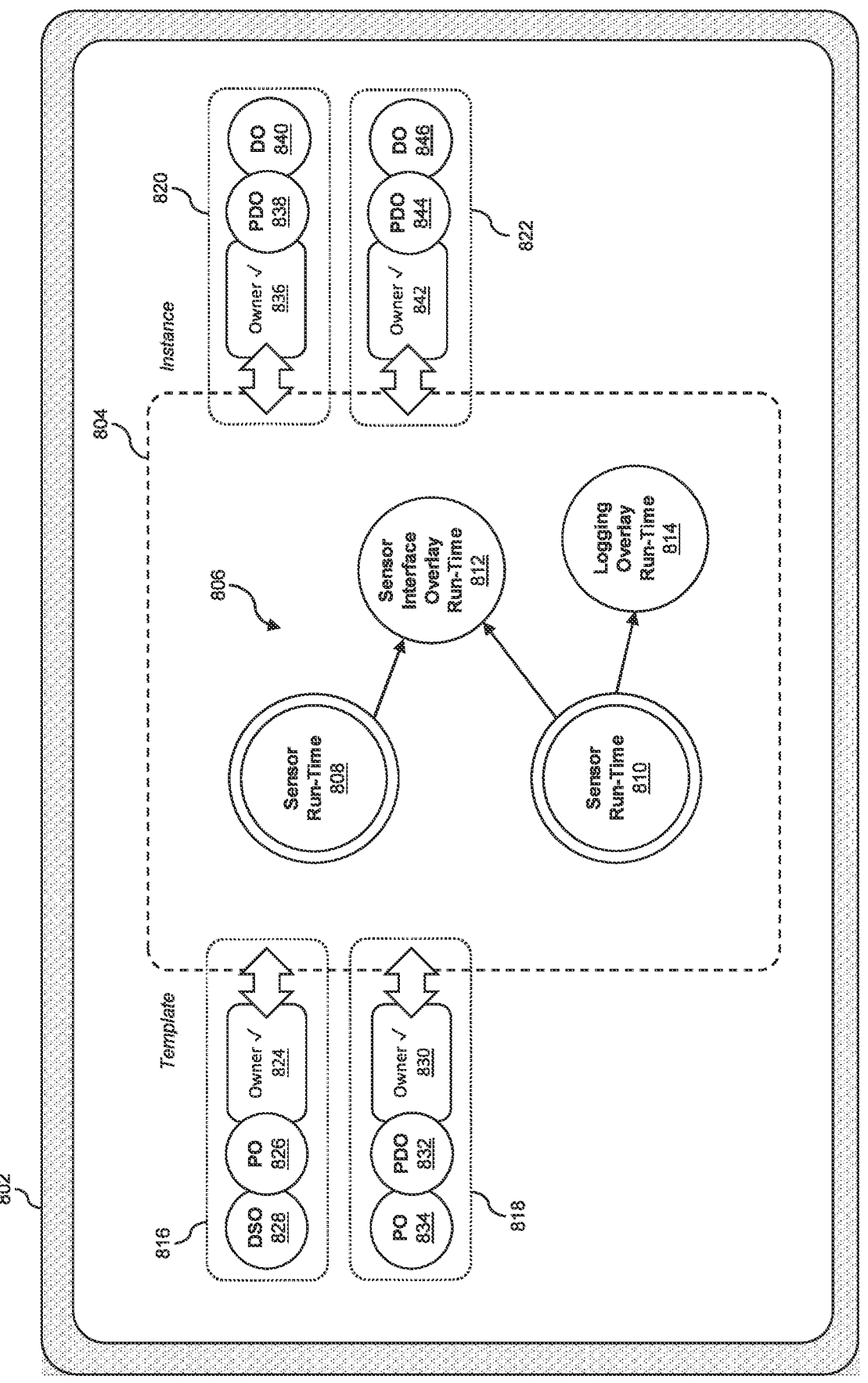
FIGS. 8A-8D illustrate the visualization of ownership and ownership boundaries within templated executable graph-based models according to an embodiment of the present disclosure.

FIG. 8A shows a device 802 upon which a user interface is displayed comprising a first portion 804. The first portion 804 comprises a first graphical representation 806 associated with a templated executable graph-based model. The first graphical representation comprises a first display element 808, a second display element 810, a third display element 812, and a fourth display element 814. Also displayed on the user interface, and concurrent to the display of the first portion 804, is a second graphical representation 816, a third graphical representation 818, a fourth graphical representation 820, and a fifth graphical representation 822. The skilled person will appreciate that the dashed lines circumscribing the first portion 804, the second graphical representation 816, the third graphical representation 818, the fourth graphical representation 820, and the fifth graphical representation 822 do not necessarily form a part of the user interface and are used for the purpose of illustration. The second graphical representation 816 comprises a first selectable display element 824, a second selectable display element 826, and a third selectable display element 828. The third graphical representation 818 comprises a fourth selectable display element 830, a fifth selectable display element 832, and a sixth selectable display element 834. The fourth graphical representation 820 comprises a seventh selectable display element 836, an eighth selectable display element 838, and a ninth selectable display element 840. The fifth graphical representation 822 comprises a tenth selectable display element 842, an eleventh selectable display element 844, and a twelfth selectable display element 846.

The first graphical representation 806 corresponds to a visual representation of the run-time version of the templated executable graph-based model shown in FIGS. 7A and 7B. The first display element 808 corresponds to an executable run-time node generated at run-time and comprising a composition of the first bounded executable node template 706-1 and the first bounded executable node instance 716-1 shown in FIG. 7B. The second display element 810 corresponds to an executable run-time node generated at run-time and comprising a composition of the first bounded executable node template 706-1 and the second bounded executable node instance 720-1 shown in FIG. 7B. The third display element 812 corresponds to a run-time overlay generated at run-time and comprising a composition of the first bounded executable overlay template 710-1 and the first overlay instance 714 shown in FIG. 7B. The fourth display element 814 corresponds to a run-time overlay generated at run-time and comprising a composition of the second bounded executable node template 712-1 and the second overlay instance 724 shown in FIG. 7B.

The second graphical representation 816 and the third graphical representation 818 comprise a plurality of selectable display elements related to owners of the template structure of the templated executable graph-based model. The second graphical representation 816 comprises a plurality of selectable display elements related to a first owner. In this example, the first owner corresponds to the manufacturer of the system which interfaces with the soil moisture sensors (as described above). The first selectable display element 824 is associated directly to the first owner. The second selectable display element 826 is associated with a process ownership overlay (i.e., the first PO overlay 734 shown in FIG. 7B) and the third selectable display element 828 is associated with a data structure ownership overlay (i.e., the first DSO overlay 732 shown in FIG. 7B). The third graphical representation 818 comprises a plurality of selectable display elements related to a second owner. In this example, the second owner corresponds to the developer of the logging software and is, thus, different to the first owner. The fourth selectable display element 830 is associated directly to the second owner. The fifth selectable display element 832 is associated with a process data ownership overlay (i.e., the second PDO overlay 744 shown in FIG. 7B) and the sixth selectable display element 834 is associated with a process ownership overlay (i.e., the second PO overlay 736 shown in FIG. 7B).

The fourth graphical representation 820 and the fifth graphical representation 822 comprise a plurality of selectable display elements related to owners of the instance structure of the templated executable graph-based model. The fourth graphical representation 820 comprises a plurality of selectable display elements related to a third owner. In this example, the third owner corresponds to the owner of the soil moisture sensor to which the first node instance 716 shown in FIGS. 7A and 7B relates. The seventh selectable display element 836 is associated directly to the third owner. The eighth selectable display element 838 is associated with a process data ownership overlay (i.e., a run-time ownership overlay comprising a composition of the first PDO overlay template 738 and the first PDO overlay instance 740 shown in FIG. 7B) and the ninth selectable display element 840 is associated with a data ownership overlay (i.e., a run-time ownership overlay comprising a composition of the first DO overlay template 726 and the first DO overlay instance 728 shown in FIG. 7B). The fifth graphical representation 822 comprises a plurality of selectable display elements related to a fourth owner. In this example, the fourth owner corresponds to the owner of the soil moisture sensor to which the second node instance 720 shown in FIGS. 7A and 7B relates. The tenth selectable display element 842 is associated directly to the fourth owner. The eleventh selectable display element 844 is associated with a process data ownership overlay (i.e., a run-time ownership overlay comprising a composition of the first PDO overlay template 738 and the second PDO overlay instance 742 shown in FIG. 7B) and the twelfth selectable display element 846 is associated with a data ownership overlay (i.e., a run-time ownership overlay comprising a composition of the first DO overlay template 726 and the second DO overlay instance 730 shown in FIG. 7B).

The second graphical representation 816, the third graphical representation 818, the fourth graphical representation 820, and the fifth graphical representation 822 are displayed around a periphery of the user interface (i.e., a periphery of the first portion 804). Advantageously, this enables a separation between the first portion 804—which display the visualization of the template-based executable graph-based model—and the ownership based information whilst still maintaining contextual relations between the two portions.

The user interface shown in FIG. 8A corresponds to the user interface shown when all ownership relationships and ownership boundaries defined within the templated executable graph-based model are visible and enabled. This is visually indicated in FIG. 8A by the tick marks ("✓") shown in the first selectable display element 824, the fourth selectable display element 830, the seventh selectable display element 836, and the tenth selectable display element 842. These tick marks display a current selection status in relation to the corresponding owner and thus provide visual feedback to the user as to the state of the visualization of the template-based executable graph-based model shown within the first portion 804.

Any of the selectable display elements described above and shown in FIG. 8A may be selected to transform the visualization of the templated executable graph-based model and filter the visualization based on ownership. For example, a user may select a selectable display element associated with either the second graphical representation 816, the third graphical representation 818, the fourth graphical representation 820, or the fifth graphical representation 822 to filter the visualization of the first graphical representation 806 based on an ownership association related to the selected selectable display element. Thus, a user of the device 802 may show or hide specific ownership relations to visualize the ownership boundaries of the template-based executable graph-based model efficiently and intuitively.

Figure 8B:
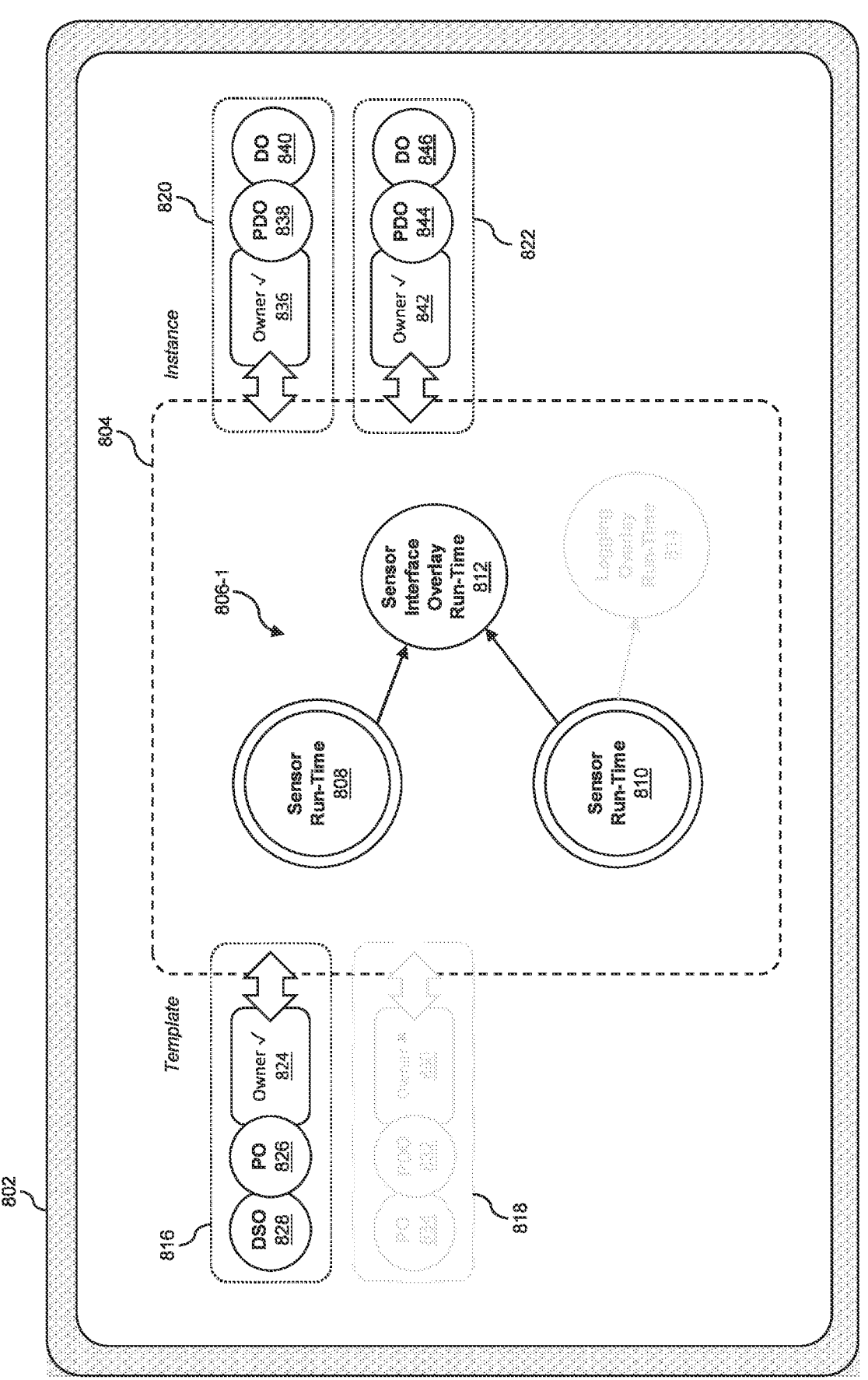

FIG. 8B shows the user interface shown in FIG. 8A after a user input has been received according to an embodiment of the present disclosure.

FIG. 8B shows the device 802 with a first filtered graphical representation 806-1 of the templated executable graph-based model. The first filtered graphical representation 806-1 is shown in place of the first graphical representation 806 (shown in FIG. 8A) in response to a first user input being received.

The first user input corresponds to a user selection associated with the third graphical representation 818—i.e., a user selection associated with the second owner (the developer of the logging software). More particularly, the first user input corresponds to a user selection of the fourth selectable display element 830, which is a selectable display element directly associated with the second owner. The first user input results in all elements (nodes/run-time nodes/run-time overlays, etc.) of the templated executable graph-based model which are related to the second owner to be removed (or de-emphasized) from the visualization. This results in the fourth display element 814 shown in FIG. 8A to be excluded (or de-emphasized) from the first filtered graphical representation 806-1 of the templated executable graph-based model shown in FIG. 7B. The fourth display element 814 is excluded (or de-emphasized) because the first user input corresponds to a request to de-select all elements within the templated executable graph-based model which are related to the second owner. That is, because the fourth display element 814 is associated with the second bounded executable overlay template 712-1 shown in FIG. 7B—to which the second owner is both the process owner and process data owner by virtue of the second PO overlay 736 and second first PDO overlay 744—it is excluded from the first filtered graphical representation 806-1 as a result of the first user input. This ownership relationship is not visually represented to the user in the first graphical representation 806 shown in FIG. 8A and thus the user interaction results in the "hidden" state of the ownership boundaries to be visually conveyed.

As seen in FIG. 8B, the exclusion of elements (nodes) in the first filtered graphical representation 806-1 associated with the second user is visually expressed by the de-emphasis of the fourth display element 814 from the first filtered graphical representation 806-1 and the de-emphasis of the third graphical representation 818. Moreover, to indicate that elements related to the second owner have been deselected from the visualization, a cross "x" is in place of the tick "✓" within the fourth selectable display element 830. This helps to provide visual feedback to the user as to what ownership boundaries are currently being visualized within the first portion 804. In another embodiment, the fourth display element 814 is removed from the first filtered graphical representation 806-1.

Figure 8C:
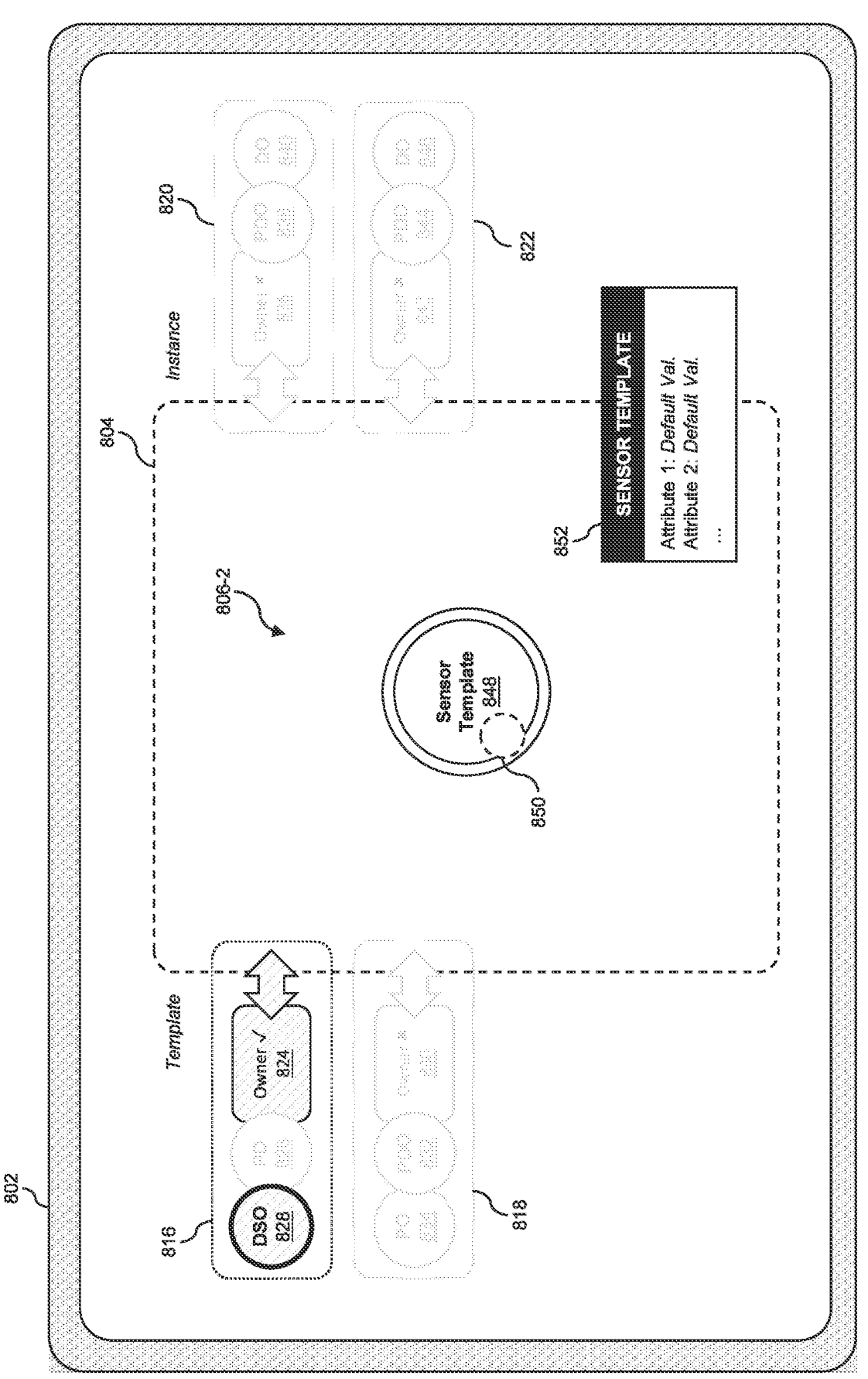

FIG. 8C shows a further example of the user interface shown in FIG. 8A after a user input has been received according to an embodiment of the present disclosure.

FIG. 8C shows the device 802 with a second filtered graphical representation 806-2 of the templated executable graph-based model. The second filtered graphical representation 806-2 is shown in place of the first graphical representation 806 in response to a second user input being received. Whilst FIG. 8C is described in relation to a user input being received when the user interface shown in FIG. 8A is being displayed, the skilled person will appreciate that the example shown in FIG. 8C may also occur as a result of a user input being received when the user interface shown in FIG. 8B is being displayed.

The second user input corresponds to a user selection associated with the second graphical representation 816—i.e., a user selection associated with the first owner (the manufacturer of the system which interfaces with the soil moisture sensors). More particularly, the second user input corresponds to a user selection of the third selectable display element 828 which is a display element associated with the first DSO overlay 732 shown in FIG. 7B. The first DSO overlay 732 in FIG. 7B is associated with the template portion 702 of the templated executable graph-based model and so the second filtered graphical representation 806-2 is a visualization of the template portion of the templated executable graph-based model (as opposed to the run-time view shown in FIGS. 8A and 8B). As such, the second filtered graphical representation 806-2 comprises a fifth display element 848 associated with the first bounded executable node template 706-1 for which the first owner is the data structure owner (by virtue of the first DSO overlay 732) as shown in FIG. 7B. All elements within the templated executable graph-based model which do not have the first owner as data structure owner are excluded (or de-emphasized) from the second filtered graphical representation 806-2.

By showing the template portion of the templated executable graph-based model, a user may then further interrogate the model to view properties of the template portion. For example, as shown in FIG. 8C, a third user input 850 is received and in response an attribute pane 852 is displayed on the user interface. The third user input 850 corresponds to a user selection of the fifth display element 848. The attribute pane 852 shows the attribute templates which are associated with the first bounded executable node template 706-1—i.e., the set of attribute templates 708 shown in FIG. 7B. Therefore, the user is provided with an efficient way of navigating through the ownership structure of the templated executable graph-based model to view properties related to specific aspects of the model without cluttering the interface.

Figure 8D:
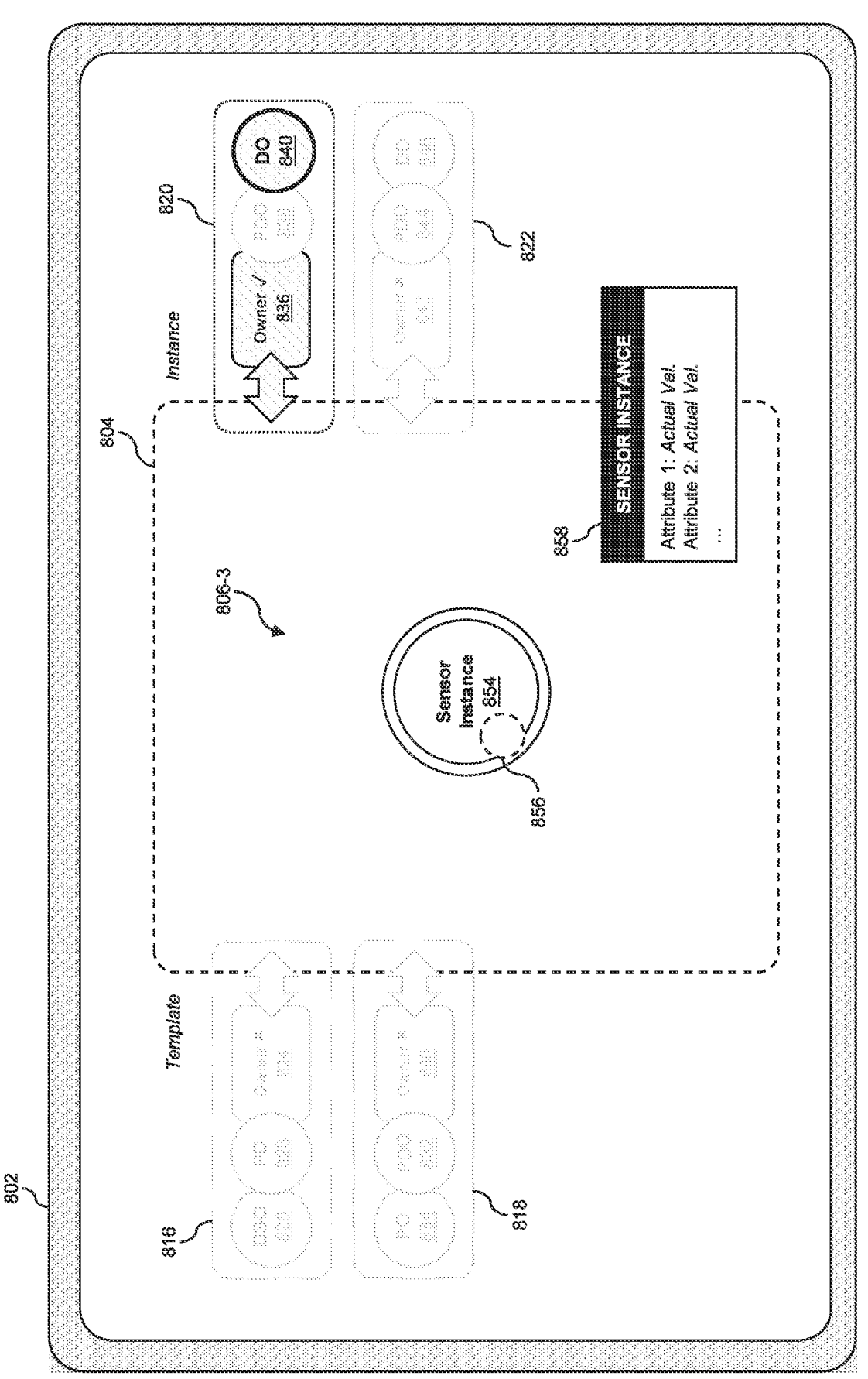

FIG. 8D shows a further example of the user interface shown in FIG. 8A after a user input has been received according to an embodiment of the present disclosure.

FIG. 8D shows the device 802 with a third filtered graphical representation 806-3 of the templated executable graph-based model. The third filtered graphical representation 806-3 is shown in place of the first graphical representation 806 in response to a fourth user input being received. Whilst FIG. 8D is described in relation to a user input being received when the user interface shown in FIG. 8A is being displayed, the skilled person will appreciate that the example shown in FIG. 8D may also occur as a result of a user input being received when the user interface shown in either FIG. 8B or 8C is being displayed.

The fourth user input corresponds to a user selection associated with the fourth graphical representation 820—i.e., a user selection associated with the third owner (the owner of the soil moisture sensor to which the first bounded executable node instance 716-1 shown in FIG. 7B relates). More particularly, the fourth user input corresponds to a user selection of the ninth selectable display element 840 which is a display element associated with the first DO overlay instance 728 shown in FIG. 7B. The first DO overlay instance 728 in FIG. 7B is associated with the instance portion 704 of the templated executable graph-based model and so the third filtered graphical representation 806-3 is a visualization of the instance portion of the templated executable graph-based model (as opposed to the run-time view shown in FIGS. 8A and 8B or the template view shown in FIG. 8C). As such, the third filtered graphical representation 806-3 comprises a sixth display element 854 associated with the first bounded executable node instance 716-1 for which the third owner is the data owner (by virtue of the first DO overlay instance 728) as shown in FIG. 7B. However, the second bounded executable node instance 720-1 shown in FIG. 7B is not shown within the third filtered graphical representation 806-3 because the third owner is not the data owner of this node instance. That is, all elements within the templated executable graph-based model which do not have the third owner as data owner are removed (or de-emphasized) from the third filtered graphical representation 806-3.

By showing the instance portion of the templated executable graph-based model, a user may then further interrogate the model to view properties of the instance portion. For example, as shown in FIG. 8D, a fifth user input 856 is received and in response an attribute pane 858 is displayed on the user interface. The fifth user input 856 corresponds to a user selection of the sixth display element 854. The attribute pane 858 shows the attribute instances which are associated with the first bounded executable node instance 716-1—i.e., the first set of attribute instances 718 shown in FIG. 7B. Therefore, the user is provided with an efficient way of navigating through the ownership structure of the templated executable graph-based model to view properties related to specific aspects of the model without cluttering the interface.

The description will now turn to methods which operate in conjunction with the systems and functionality described above.

Figure 9:
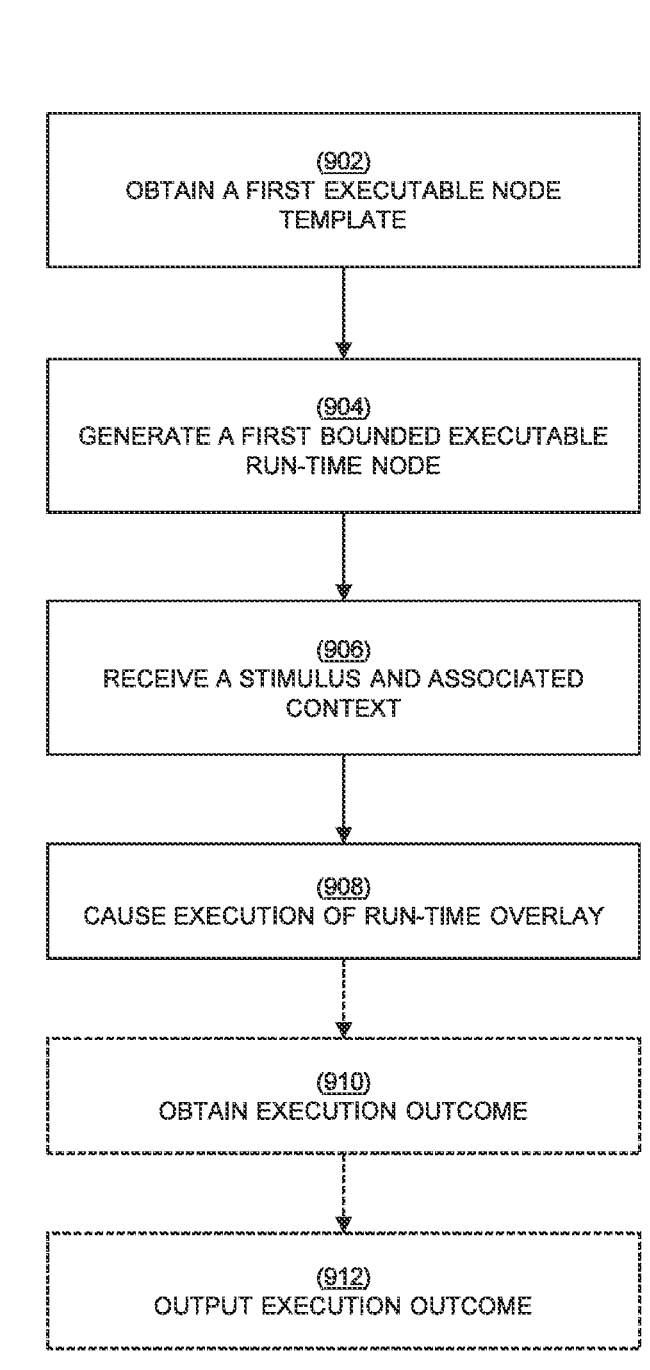
FIG. 9 shows a method for maintaining ownership integrity of templated executable graph-based models according to an aspect of the present disclosure.

FIG. 9 shows a method 900 for maintaining ownership integrity of templated executable graph-based models according to an aspect of the present disclosure.

The method 900 comprises the steps of obtaining 902 a first node template, generating 904 a first bounded executable run-time node, receiving 906 a stimulus and associated context, and causing 908 execution of a run-time overlay. The method 900 optionally comprises the steps of obtaining 910 an execution outcome and outputting 912 the execution outcome. In one embodiment, the method 900 is performed by a system such as the system 300 described above in relation to FIG. 3.

At the step of obtaining 902, a first node template is obtained (e.g., the node template 404 shown in FIG. 4B). The first node template comprises a predetermined node structure and one or more rules governing generation of node instances based on the first node template.

A node template defines all the structural and behavioral aspects of an ontology. That is, a node template defines what is allowed for a node instance when generated as part of an executable graph-based model. Here, the node structure may be understood as the various elements, properties, and configurations defined by the node template (as described in more detail in relation to FIG. 4A above). The one or more rules may be understood as referring to the configuration settings which are used by a node template when generating a node instance (e.g., identifier generation, or version numbering) and/or the rules governing the assignment of instance values to attribute templates defined in the node template. For example, ensuring that instance values assigned to an attribute template having a type of string are themselves strings (and not integers, floats, etc.). As a further example, the one or more rules may include rules governing the range of possible values that may be assigned to an attribute template such as limiting the instance values to be positive values, strings of a certain length, values which match a predetermined pattern, or the like.

The node template may be read only, such that the data and structure defined by the node template is accessible to a corresponding node instance but not editable. The node template may comprise an attribute template. The attribute template comprises a name and a value type for a corresponding attribute. The value for the corresponding attribute may be assigned or set by an associated node instance (e.g., during generation of the node instance). The node template may define a default value for the attribute template. The default value corresponds to the value assigned to the attribute template if no value is expressly assigned by the node instance.

At the step of generating 904, a first bounded executable run-time node is generated. The first bounded executable run-time node comprises the first node template, a first node instance generated according to the first node template, and an overlay structure.

Thus, the term "bounded" in relation to a node (e.g., a node template, executable node-template, executable run-time node, etc.) is used to indicate that the node has at least one ownership overlay within its overlay structure (i.e., registered with its overlay manager, or an overlay manager of one of its encompassing nodes). Non-ownership based overlays, or run-time overlays, may still be associated with bounded node templates and/or bounded node overlays. Therefore, a bounded executable node template refers to a node template having an overlay structure which includes an ownership overlay and a non-ownership overlay (e.g., an overlay template or a run-time overlay).

As such, the overlay structure of the first bounded executable run-time overlay comprises a run-time overlay and an ownership overlay. The run-time overlay comprises an overlay template and an overlay instance comprising processing logic operable to interact with the first node template and/or the first node instance during execution. The ownership overlay defines a first ownership rule associated with the first bounded executable run-time node.

In one embodiment, the method 900 further comprises obtaining the run-time overlay. As stated in relation to FIGS. 4A-4D above, the run-time overlay may be obtained or generated in several ways. In general, the run-time overlay may be obtained by obtaining the overlay template and the first overlay instance, and then associating the overlay template and the first overlay instance to generate the run-time overlay. The node template may be an executable node template such that both the overlay template and the overlay instance are associated with the node template. Alternatively, the overlay template may be associated with the node template, but the overlay instance is associated with the node instance. That is, the overlay instance provides its own unique implementation of the overlay template. In addition, the overlay template may be shared by the first run-time overlay and a second run-time overlay. Access to the overlay template may be restricted to read only access such that the overlay instance may access the data and/or structures of the overlay template but may not modify the overlay template in any way.

The first ownership rule defined by the ownership overlay is one of a data structure ownership rule, a data ownership rule, a process ownership rule, or a process data ownership rule. The data structure ownership rule associates an owner with the predetermined node structure and one or more rules of the first node template. The data ownership rule associates an owner with data related to the first node template. Here, data related to the first node template includes template data held by the first node template and/or instance data held by the first node instance. The owners associated with the data structure ownership rule and the data ownership rule may be different. In one embodiment, when the first ownership rule is a data structure ownership rule, the first bounded node template further comprises a second ownership overlay which defines a second ownership rule for the first node template, where the second ownership rule is a data ownership rule.

The process ownership rule associates an owner with the overlay template of the run-time overlay. The process data ownership rule associates an owner with data generated during execution of the processing logic of the run-time overlay. The owners associated with the process overlay rule and the process data overlay rule may be different.

The owners associated with each of the ownership overlays may be from a set of one or more owners such that all the owners may be different. For example, the first bounded node template may further comprise a second ownership overlay defining a second ownership rule, a third ownership overlay defining a third ownership rule, and a fourth ownership overlay defining a fourth ownership rule. The first ownership rule is a process data ownership rule which associates a first owner with data generated during execution of the processing logic of the run time overlay. The second ownership rule is a process ownership rule which associated a second owner with the processing logic of the run-time overlay. The third ownership rule is a data structure ownership rule which associates a third owner with the predetermined node structure and one or more rules of the first node template. The fourth ownership rule is a data ownership rule which associates a fourth owner with data related to the first node template. In one example, the owners within the set of owners (i.e., the first owner, the second owner, the third owner, and the fourth owner) are all different. In a further example, there are at least two unique owners within the set of owners.

In one embodiment, the step of generating 904 the first bounded executable run-time node further comprises generating (not shown) the first node instance. The first node instance is generated by mapping one or more data elements to the first node template based on the one or more rules of the first node template. For example, if the node template represents a person and requires values for the attribute templates of surname and first name to be set; then the one or more data elements may comprise instance values for these attribute templates—e.g., the values "Worthington" and "Nathan"—which are mapped to the attribute templates based on rules which ensure that the values are of type string. The method 900 may further comprise receiving (not shown) the one or more data elements, where the first executable run-time node is generated in response to the one or more data elements being received.

In one embodiment, the first bounded executable run-time node is part of a templated executable graph-based model comprising a second bounded executable run-time node. The second bounded executable run-time node comprises a second bounded node template which includes a second ownership overlay defining a second ownership rule. The first ownership rule is associated with a first owner and the second ownership rule is associated with a second owner. The first owner and the second owner are different.

The method 900 may further comprise the step of generating (not shown) the second bounded executable run-time node. The skilled person will appreciate that the step of generating the second bounded executable run-time node substantially corresponds to the process performed at the step of generating 904 the first bounded executable run-time node.

At the step of receiving 906, a stimulus and an associated context are received.

Stimuli provide the basis for all interactions within an executable graph-based model. The first stimulus has a type such as a command (e.g., a transactional request), a query, or an event from an internal or external system. The first stimulus is either externally or internally generated (triggered). For example, the first stimulus may be associated with an event related to an external device which is then received by the template-based executable graph-based model. Alternatively, the first stimulus may have been generated by processing logic within the template-based executable graph-based model.

At the step of causing 908, execution of the processing logic of the run-time overlay is caused in response to the stimulus being received. The execution is in accordance with the first ownership rule of the first ownership overlay. That is, the ownership boundaries defined by the first ownership overlay are maintained before, during, and after the step of causing 908 execution.

In an embodiment, execution of the processing logic of the run-time overlay is based on the context received with the stimulus. For example, the context comprises information necessary for the processing logic to be executed.

The first bounded executable run-time node comprises a state. The execution of the processing logic caused at the causing 908 step, may cause a change in the state of the first bounded executable run-time node, or a component node thereof (e.g., the first node instance). For example, the execution of the processing logic may cause an instance value to be set. In a further example, execution of the processing logic may cause a new attribute to be generated and may also set an instance value for the new attribute. The execution can also leave the state of the first bounded executable run-time node unchanged. For example, the execution of the processing logic can cause an instance value of an attribute instance to be output.

Figure 10:
FIG. 10 shows a method for visualization of owner-based templated executable graph-based models according to an aspect of the present disclosure.
Figure 10:
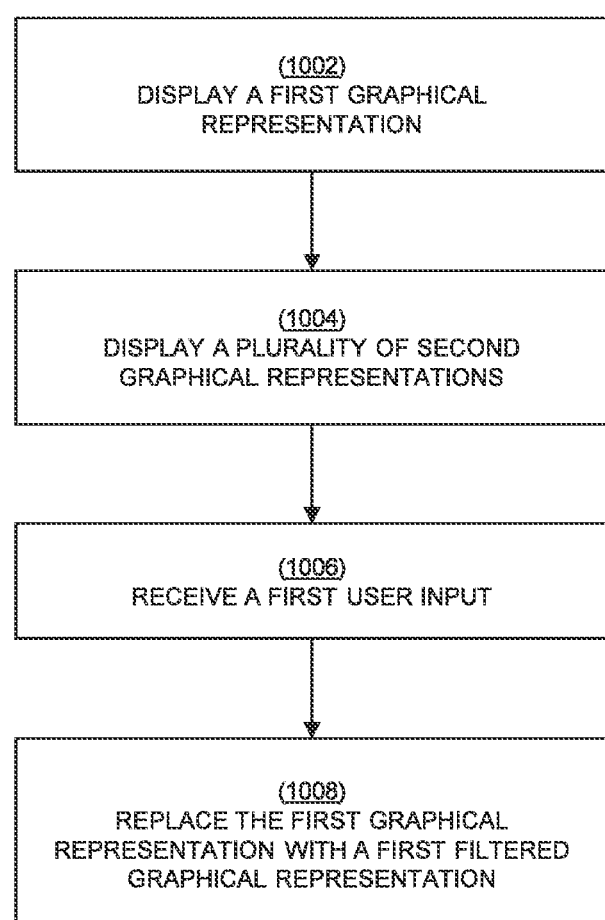

FIG. 10 shows a method 1000 for visualization of owner-based templated executable graph-based models according to an aspect of the present disclosure.

The method 1000 comprises the steps of displaying 1002 a first graphical representation, displaying 1004 a plurality of second graphical representations, receiving 1006 a first user input, and replacing 1008 the first graphical representation with a first filtered graphical representation. In one embodiment, the method 1000 is performed by a system such as the system 300 described above in relation to FIG. 3.

At the step of displaying 1002, a first graphical representation associated with a templated executable graph-based model is displayed (e.g., the first graphical representation 806 shown in FIG. 8A). The templated executable graph-based model comprises a plurality of nodes and a plurality of ownership overlay structures. Each ownership structure of the plurality of ownership overlay structures assigns one or more owners of a set of owners to a respective one of the plurality of nodes.

At the step of displaying 1004, a plurality of second graphical representations are displayed concurrent to the display of the first graphical representation (e.g., the second graphical representation 816, the third graphical representation 818, and the fourth graphical representation 820 shown in FIG. 8A). Each of the plurality of second graphical representations is associated with an owner of the set of owners.

The second graphical representation is displayed around a periphery of the user interface. Each of the plurality of second graphical representations comprises a display element identifying a respective owner (e.g., the first selectable display element 824 shown in FIG. 8A identifies the first owner) and one or more second display elements associated with one or more ownership overlays of an ownership overlay structure associated with the respective owner (e.g., the second selectable display element 826 and the third selectable display element 828). Each of the one or more ownership overlays is associated with one of a process data ownership rule, a process ownership rule, a data structure ownership rule, or a data ownership rule. The second graphical representation may further comprise a third display element indicative of a current selection status for the first owner (e.g., the first selectable display element 824 indicates by a tick mark, or cross mark, the selection status for the first owner).

At the step of receiving 1006, a first user input associated with a respective second graphical representation of the plurality of second graphical representations is received. The respective second graphical representation is associated with a first owner of the set of owners.

At the step of replacing 1008, the first graphical representation is replaced with a first filtered graphical representation in response to receiving the first user input (e.g., the first graphical representation 806 shown in FIG. 8A is replaced by the first filtered graphical representation 806-1 shown in FIG. 8B). The first graphical representation is replaced whilst maintaining display of the second graphical representation (e.g., as shown in FIG. 8B, display of the second graphical representation 816, the third graphical representation 818, and the fourth graphical representation 820 is maintained). The first filtered graphical representation is based on one or more of the plurality of nodes of the templated executable graph-based model associated with the first owner.

In one example, the first filtered graphical representation consists of one or more display elements associated with the one or more of the plurality of nodes associated with the first owner. The one or more of the plurality nodes may include a run-time node and a run-time overlay. This is illustrated in FIG. 8D where the third filtered graphical representation 806-3 comprises a visual representation of nodes within the template-based executable graph-based model which assign the second owner as the data owner.

In a further example, the first filtered graphical representation consists of one or more display elements associated with one or more of the plurality of nodes which are not associated with the first owner. This is illustrated in FIG. 8B where the first filtered graphical representation 806-1 comprises a visual representation of nodes within the template-based executable graph-based model which are not associated with the third owner.

Figure 11:
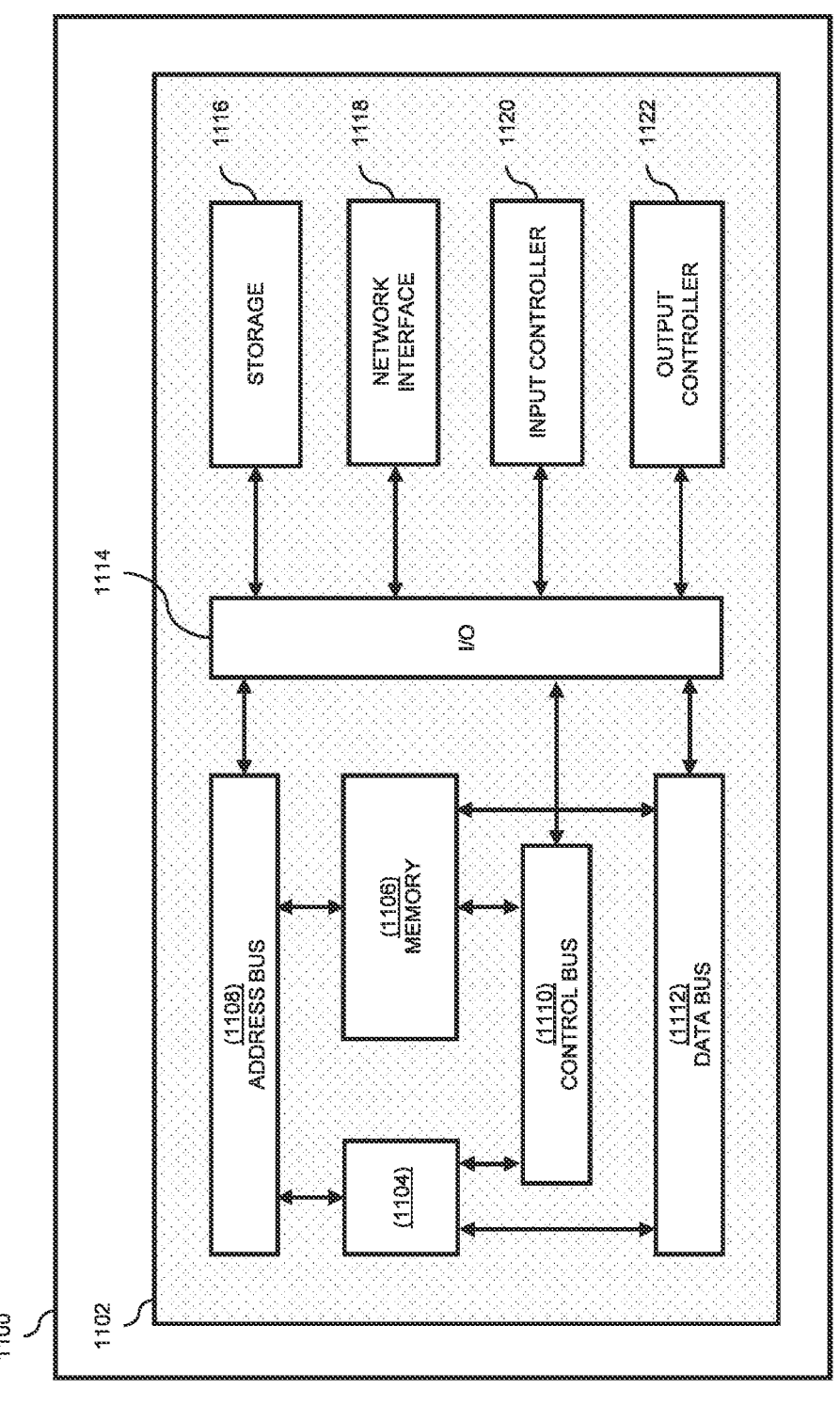
FIG. 11 shows an example computing system for carrying out the methods of the present disclosure.

FIG. 11 shows an example computing system for carrying out the methods of the present disclosure. Specifically, FIG. 11 shows a block diagram of an embodiment of a computing system according to example embodiments of the present disclosure.

Computing system 1100 can be configured to perform any of the operations disclosed herein such as, for example, any of the operations discussed with reference to the functional modules described in relation to FIG. 3. The computing system 1100 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1100 is a distributed system configured to function using multiple computing machines interconnected via a data network or bus system.

The computing system 1100 includes one or more computing device(s) 1102. The one or more computing device(s) 1102 of computing system 1100 comprise one or more processors 1104 and memory 1106. One or more processors 1104 can be any general purpose processor(s) configured to execute a set of instructions. For example, one or more processors 1104 can be a processor core, a multiprocessor, a reconfigurable processor, a microcontroller, a digital signal processor ("DSP"), an application-specific integrated circuit ("ASIC"), a graphics processing unit ("GPU"), a neural processing unit ("NPU"), an accelerated processing unit ("APU"), a brain processing unit ("BPU"), a data processing unit ("DPU"), a holographic processing unit ("HPU"), an intelligent processing unit ("IPU"), a microprocessor/micro-controller unit ("MPU/MCU"), a radio processing unit ("RPU"), a tensor processing unit ("TPU"), a vector processing unit ("VPU"), a wearable processing unit ("WPU"), a field programmable gate array ("FPGA"), a programmable logic device ("PLD"), a controller, a state machine, gated logic, discrete hardware component, any other processing unit, or any combination or multiplicity thereof. In one embodiment, one or more processors 1104 include one processor. Alternatively, one or more processors 1104 include a plurality of processors that are operatively connected. For example, the one or more processors 1104 can be multiple processing units, a single processing core, multiple processing cores, special purpose processing cores, co-processors, or any combination thereof. One or more processors 1104 are communicatively coupled to memory 1106 via address bus 1108, control bus 1110, and data bus 1112.

Memory 1106 can include non-volatile memories such as read-only memory ("ROM"), programmable read-only memory ("PROM"), erasable programmable read-only memory ("EPROM"), flash memory, or any other device capable of storing program instructions or data with or without applied power. The memory 1106 can also include volatile memories, such as random-access memory ("RAM"), static random-access memory ("SRAM"), dynamic random-access memory ("DRAM"), and synchronous dynamic random-access memory ("SDRAM"). The memory 1106 can comprise single or multiple memory modules. While the memory 1106 is depicted as part of the one or more computing device(s) 1102, the skill person will recognize that the memory 1106 can be separate from the one or more computing device(s) 1102.

Memory 1106 can store information that can be accessed by one or more processors 1104. For instance, memory 1106 (e.g., one or more non-transitory computer-readable storage mediums, memory devices) can include computer-readable instructions (not shown) that can be executed by one or more processors 1104. The computer-readable instructions can be software written in any suitable programming language or can be implemented in hardware. Additionally, or alternatively, the computer-readable instructions can be executed in logically and/or virtually separate threads on one or more processors 1104. For example, memory 1106 can store instructions (not shown) that when executed by one or more processors 1104 cause one or more processors 1104 to perform operations such as any of the operations and functions for which computing system 1100 is configured, as described herein. In addition, or alternatively, memory 1106 can store data (not shown) that can be obtained, received, accessed, written, manipulated, created, and/or stored. The data can include, for instance, the data and/or information described herein in relation to FIGS. 1 to 10. In some implementations, the one or more computing device(s) 1102 can obtain from and/or store data in one or more memory device(s) that are remote from the computing system 1100.

The one or more computing device(s) 1102 further comprise I/O (input/output) interface 1114 communicatively coupled to address bus 1108, control bus 1110, and data bus 1112. The I/O interface 1114 (alternatively referred to as an interface unit) is configured to couple to one or more external devices (e.g., to receive and send data from/to one or more external devices). Such external devices, along with the various internal devices, may also be known as peripheral devices. The I/O interface 1114 may include both electrical and physical connections for operably coupling the various peripheral devices to the one or more computing device(s) 1102. The I/O interface 1114 may be configured to communicate data, addresses, and control signals between the peripheral devices and the one or more computing device(s) 1102. The I/O interface 1114 may be configured to implement any standard interface, such as a small computer system interface ("SCSI"), serial-attached SCSI ("SAS"), fiber channel, peripheral component interconnect ("PCI"), PCI express ("PCIe"), serial bus, parallel bus, advanced technology attachment ("ATA"), serialATA ("SATA"), universal serial bus ("USB"), Thunderbolt, FireWire, various video buses, and the like. The I/O interface 1114 is configured to implement only one interface or bus technology. Alternatively, the I/O interface 1114 is configured to implement multiple interfaces or bus technologies. The I/O interface 1114 may include one or more buffers for buffering transmissions between one or more external devices, internal devices, the one or more computing device(s), or the one or more processors 1104. The I/O interface 1114 may couple the one or more computing device(s) 1102 to various input devices to receive user input. Such input devices include mice, touch screens, scanners, biometric readers, electronic digitizers, sensors, receivers, touchpads, trackballs, cameras, microphones, keyboards, any other pointing devices, or any combinations thereof. The I/O interface 1114 may couple the one or more computing device(s) 1102 to various output devices, including video displays, speakers, printers, projectors, tactile feedback devices, automation control, robotic components, actuators, motors, fans, solenoids, valves, pumps, transmitters, signal emitters, lights, and so forth.

Computing system 1100 further comprises storage unit 1116, network interface 1118, input controller 1120, and output controller 1122. Storage unit 1116, network interface 1118, input controller 1120, and output controller 1122 are communicatively coupled to the central control unit (i.e., the memory 1106, the address bus 1108, the control bus 1110, and the data bus 1112) via I/O interface 1114. The network interface 1118 communicatively couples the computing system 1100 to one or more networks such as wide area networks ("WAN"), local area networks ("LAN"), intranets, the Internet, wireless access networks, wired networks, mobile networks, telephone networks, optical networks, or combinations thereof. The network interface 1118 may facilitate communication with packet switched networks or circuit switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

Storage unit 1116 is a computer readable medium, preferably a non-transitory computer readable medium, comprising one or more programs, the one or more programs comprising instructions which when executed by the one or more processors 1104 cause computing system 1100 to perform the method steps of the present disclosure. Alternatively, storage unit 1116 is a transitory computer readable medium. Storage unit 1116 can include a hard disk, a floppy disk, a compact disc read-only memory ("CD-ROM"), a digital versatile disc ("DVD"), a Blu-ray disc, a magnetic tape, a flash memory, another non-volatile memory device, a solid-state drive ("SSD"), any magnetic storage device, any optical storage device, any electrical storage device, any semiconductor storage device, any physical-based storage device, any other data storage device, or any combination or multiplicity thereof. In one embodiment, the storage unit 1116 stores one or more operating systems, application programs, program modules, data, or any other information. The storage unit 1116 is part of the one or more computing device(s) 1102. Alternatively, the storage unit 1116 is part of one or more other computing machines that are in communication with the one or more computing device(s) 1102, such as servers, database servers, cloud storage, network attached storage, and so forth.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of all examples, or exemplary language ("e.g.," "such as," "including," or the like) provided herein, is intended merely to better illuminate the embodiments, and does not pose a limitation on the scope of the embodiments or the claims.

Moreover, for example, the present technology/system may achieve the following configurations: 1. A method for template-driven generation of run-time executable graph-based models, the method comprising: obtaining, by processing circuitry, a node template comprising a predetermined node structure and one or more rules governing generation of node instances based on the node template; receiving, by the processing circuitry, one or more data elements; in response to the one or more data elements being received, generating, by the processing circuitry, a first run-time node comprising the node template and a first node instance, wherein the first node instance comprises the one or more data elements mapped to the node template based on the one or more rules of the node template; obtaining, by the processing circuitry, a first run-time overlay comprising an overlay template and a first overlay instance comprising processing logic implementing at least one generic rule of the overlay template; and generating, by the processing circuitry, a first executable run-time node comprising a composition of the first run-time node and the first run-time overlay such that the processing logic of the first run-time overlay is operable to interact with the first run-time node during execution of the first executable run-time node. 2. The method of statement 1 further comprising, prior to the step of receiving the one or more data elements: receiving, by the processing circuitry, a first stimulus and a first context associated with the first stimulus, wherein the step of receiving the one or more data elements occurs in response to the first stimulus being received. 3. The method of statement 2 wherein the step of receiving the one or more data elements is based on the first context. 4. The method of statement 1 further comprising, after the step of generating the first executable run-time node: receiving, by the processing circuitry, a second stimulus and a second context associated with the second stimulus; and in response to the second stimulus being received, causing, by the processing circuitry, an execution of the processing logic of the first run-time overlay of the first executable run-time node. 5. The method of statement 4 wherein the execution of the processing logic is based on the second context. 6. The method of statement 4 further comprising, after the step of causing execution: obtaining, by the processing circuitry, one or more outcomes of the execution; and outputting, by the processing circuitry, the one or more outcomes of the execution. 7. The method of statement 1 further comprising:

obtaining, by the processing circuitry, a second run-time node comprising the node template and a second node instance generated based on the one or more rules of the node template; and generating, by the processing circuitry, a second executable run-time node comprising a composition of the second node instance and the first run-time overlay such that the processing logic of the first run-time overlay is operable to interact with the second run-time node during execution of the second executable run-time node. 8. The method of statement 1 wherein the step of obtaining the first run-time overlay comprises: obtaining, by the processing circuitry, the overlay template and the first overlay instance; and associating, by the processing circuitry, the overlay template and the first overlay instance thereby generating the first run-time overlay. 9. The method of statement 1 wherein the step of generating the first run-time node comprises: generating, by the processing circuitry, the first node instance by mapping the one or more data elements to the node template based on the one or more rules of the node template. 10. The method of statement 1 wherein the overlay template is shared by the first run-time overlay and a second run-time overlay. 11. The method of statement 1 wherein the first run-time overlay is associated with the node template such that the node template is an executable node template. 12. The method of statement 1 wherein the overlay template of the first run-time overlay is associated with the node template and the first overlay instance of the first run-time overlay is associated with the first node instance. 13. The method of statement 1 wherein access to the overlay template of the first run-time overlay is restricted to read only access. 14. The method of statement 1 wherein access to the node template is restricted to read only access. 15. The method of statement 1 wherein the node template comprises an attribute template comprising a name and a value type for a corresponding attribute. 16. The method of statement 15 wherein the node template defines a default value for the attribute template. 17. The method of statement 15 wherein the first node instance comprises an instance value for the attribute template. 18. The method of statement 17 wherein the instance value of the node instance is assigned based on at least one of the one or more data elements. 19. A non-transitory computer readable medium storing instruction which, when executed by processing circuitry, cause the processing circuitry to carry out the steps of statement 1. 20. A device comprising processing circuitry and memory storing instructions which, when executed by the processing circuitry, cause the processing circuitry to carry out the steps of statement 1. 21. A method for loading run-time nodes of a template-based executable graph-based model, the method comprising: obtaining, by processing circuitry, a node instance manifest state based on a first unique node identifier associated with a node instance, wherein the node instance manifest state comprises a second unique node identifier associated with a node template; extracting, by the processing circuitry, a node instance manifest from the node instance manifest state, wherein the node instance manifest comprises a first storage location and the first unique node identifier; obtaining, by the processing circuitry, a node instance state from the first storage location; generating, by the processing circuitry, the node instance from the node instance manifest and the node instance state; obtaining, by the processing circuitry, the node template based on the second unique node identifier associated with the node template; and generating, by the processing circuitry, a run-time node comprising a composition of the node instance and the node template. 22. The method of statement 21 wherein the step of obtaining the node template comprises: obtaining, by the processing circuitry, a node template manifest state based on the second unique node identifier associated with the node template; extracting, by the processing circuitry, a node template manifest from the node template manifest state, wherein the node template manifest comprises a second storage location and the second unique node identifier; obtaining, by the processing circuitry, a node template state from the second storage location; and generating, by the processing circuitry, the node template from the node template manifest and the node template state. 23. The method of statement 21 further comprising: obtaining, by the processing circuitry, an executable node instance manifest state based on the first unique node identifier associated with the node instance, wherein the executable node instance manifest state comprises the first unique node identifier and a third unique node identifier associated with a first overlay instance; extracting, by the processing circuitry, an executable node instance manifest from the executable node instance manifest state, wherein the executable node instance manifest comprises a third storage location and the first unique node identifier; obtaining, by the processing circuitry, an executable node instance state from the third storage location; obtaining, by the processing circuitry, a first run-time overlay based on the third unique node identifier, wherein the first run-time overlay comprises the third unique node identifier, the first overlay instance, and a first overlay template associated with the first overlay instance; and generating, by the processing circuitry, an executable node instance based on the node instance, the executable node instance manifest, the executable node instance state, and the first run-time overlay, wherein the run-time node is generated using the executable node instance such that the composition of the run-time node comprises the executable node instance and the node template. 24. The method of statement 21 further comprising: obtaining, by the processing circuitry, an executable node template manifest state based on the second unique node identifier associated with the node template, wherein the executable node template manifest state comprises the second unique node identifier and a third unique node identifier associated with a second overlay template; extracting, by the processing circuitry, an executable node template manifest from the executable node template manifest state, wherein the executable node template manifest comprises a fourth storage location and the second unique node identifier; obtaining, by the processing circuitry, an executable node template state from the fourth storage location; obtaining, by the processing circuitry, the second overlay template based on the third unique node identifier; and associating, by the processing circuitry, the node template and the second overlay template. 25. The method of statement 24 further comprising: obtaining, by the processing circuitry, a second overlay instance based on a fourth unique node identifier, wherein the executable node template manifest comprises the fourth unique node identifier; generating, by the processing circuitry, a second run-time overlay comprising a composition of the second overlay template and the second overlay instance; generating, by the processing circuitry, an executable node template based on the node template, the executable node template manifest, the executable node template state, and the second run-time overlay, wherein the run-time node is generated using the executable node template such that the composition of the run-time node comprises the node instance and the executable node template. 26. A non-transitory computer readable medium storing instruction which, when executed by processing circuitry, cause the processing circuitry to carry out the steps of statement 21. 27. A device comprising processing circuitry and memory storing instructions which, when executed by the processing circuitry, cause the processing circuitry to carry out the steps of statement 21. 28. A method for storage management of run-time nodes of a template-based executable graph-based model, the method comprising: obtaining, by processing circuitry, a run-time node comprising a node template and a node instance generating according to the node template, wherein the node template is associated with a first unique node identifier and the node instance is associated with a second unique node identifier; extracting, by the processing circuitry, a node template state from the node template, wherein the node template state comprises the first unique node identifier; extracting, by the processing circuitry, a node instance state from the node instance, wherein the node instance state comprises the first unique node identifier and the second unique node identifier; determining, by the processing circuitry, a storage location for each of the node template state and the node instance state; generating, by the processing circuitry, a node template manifest associated with the node template, wherein the node template manifest comprises the first unique node identifier and the storage location for the node template state; generating, by the processing circuitry, a node instance manifest associated with the node instance, wherein the node instance manifest comprises the first unique node identifier, the second unique node identifier, and the storage location for the node instance state; generating, by the processing circuitry, a node template manifest state for the node template manifest, wherein the node template manifest state comprises the first unique node identifier; generating, by the processing circuitry, a node instance manifest state for the node instance manifest, wherein the node instance manifest state comprises the first unique node identifier and the second unique node identifier; and storing, by the processing circuitry, the node template manifest state and the node instance manifest state. 29. The method of statement 28 wherein the node template manifest state is stored at a first device and the node instance manifest state is stored at a second device, the second device being different to the first device. 30. The method of statement 28 further comprising: storing, by the processing circuitry, the node template state and the node instance state at their respective storage locations. 31. The method of statement 28 further comprising: obtaining, by the processing circuitry, an executable node instance comprising the node instance and a first run-time overlay having an overlay instance comprising a third unique node identifier; extracting, by the processing circuitry, an executable node instance state from the executable node instance, determining, by the processing circuitry, a storage location for the executable node instance state; generating, by the processing circuitry, an executable node instance manifest comprising the second unique node identifier associated with the node instance, the third unique node identifier, and the storage location for the executable node instance state; generating, by the processing circuitry, an executable node instance manifest state for the executable node instance manifest, wherein the executable node instance manifest state comprises the second unique node identifier; and storing, by the processing circuitry, the executable node instance manifest state. 32. The method of statement 31 further comprising: storing, by the processing circuitry, the executable node instance state at the storage location for the executable node instance state. 33. The method of statement 28 further comprising: obtaining, by the processing circuitry, an executable node template comprising the node template and an overlay template comprising a fourth unique node identifier; extracting, by the processing circuitry, an executable node template state from the executable node template, determining, by the processing circuitry, a storage location for the executable node template state; generating, by the processing circuitry, an executable node template manifest comprising the first unique node identifier associated with the node template, the fourth unique node identifier, and the storage location for the executable node template state; generating, by the processing circuitry, an executable node template manifest state for the executable node template manifest, wherein the executable node template manifest state comprises the first unique node identifier; and storing, by the processing circuitry, the executable node template manifest state. 34. The method of statement 33 further comprising: storing, by the processing circuitry, the executable node template state at the storage location for the executable node template state. 35. The method of statement 33 wherein the executable node template manifest further comprises a fifth unique node identifier associated with an overlay instance generated from the overlay template. 36. A non-transitory computer readable medium storing instruction which, when executed by processing circuitry, cause the processing circuitry to carry out the steps of statement 28. 37. A device comprising processing circuitry and memory storing instructions which, when executed by the processing circuitry, cause the processing circuitry to carry out the steps of statement 28.

What is claimed is:

1. A method for maintaining ownership integrity of templated executable graph-based models, the method comprising:

obtaining, by processing circuitry, a first node template comprising a predetermined node structure and one or more rules governing generation of node instances based on the first node template;

generating, by the processing circuitry, a first bounded executable run-time node comprising the first node template, a first node instance generated according to the first node template, and an overlay structure, wherein the overlay structure comprises:

a run-time overlay comprising an overlay template and an overlay instance comprising processing logic operable to interact with the first node template and/or the first node instance during execution; and a first ownership overlay defining a first ownership rule associated with the first bounded executable run-time node;

receiving, by the processing circuitry, a stimulus and an associated context; and in response to the stimulus being received, causing execution of the processing logic of the run-time overlay in accordance with the first ownership rule of the first ownership overlay.

2. The method of claim 1 wherein the first ownership rule is a process data ownership rule which associates a first owner with data generated during execution of the processing logic of the run-time overlay.

3. The method of claim 1 wherein the first ownership rule is a process ownership rule which associates a second owner with the overlay template of the run-time overlay.

4. The method of claim 1 wherein the first ownership rule is a data structure ownership rule which associates a third owner with the predetermined node structure and one or more rules of the first node template.

5. The method of claim 4 wherein the first bounded executable run-time node further comprises a second ownership overlay which defines a second ownership rule for the first node template.

6. The method of claim 5 wherein the second ownership rule is a data ownership rule which associates a fourth owner with data related to the first node template.

7. The method of claim 6 wherein the third owner and the fourth owner are different.

8. The method of claim 6 wherein the data related to the first node template includes template data held by the first node template and/or instance data held by the first node instance.

9. The method of claim 1 wherein the first bounded executable run-time node further comprises a second ownership overlay defining a second ownership rule, a third ownership overlay defining a third ownership rule, and a fourth ownership overlay defining a fourth ownership rule.

10. The method of claim 9 wherein:

the first ownership rule is a process data ownership rule which associates a first owner with data generated during execution of the processing logic of the run-time overlay;

the second ownership rule is a process ownership rule which associates a second owner with the processing logic of the run-time overlay;

the third ownership rule is a data structure ownership rule which associates a third owner with the predetermined node structure and one or more rules of the first node template; and the fourth ownership rule is a data ownership rule which associates a fourth owner with data related to the first node template.

11. The method of claim 10 wherein the first owner, the second owner, the third owner, and the fourth owner are all different.

12. The method of claim 1 wherein the first bounded executable run-time node is part of a templated executable graph-based model comprising a second bounded executable run-time node, the second bounded executable run-time node comprising a second bounded node template which includes a second ownership overlay defining a second ownership rule.

13. The method of claim 12 further comprising:

generating, by the processing circuitry, the second bounded executable run-time node.

14. The method of claim 12 wherein the first ownership rule is associated with a first owner and the second ownership rule is associated with a second owner.

15. The method of claim 14 wherein the first owner and the second owner are different.

16. The method of claim 1 wherein the step of generating the first bounded executable run-time node further comprises generating the first node instance.

17. The method of claim 16 wherein the first node instance is generated by mapping one or more data elements to the first node template based on the one or more rules of the first node template.

18. The method of claim 17 further comprising:

receiving, by the processing circuitry, the one or more data elements, wherein the first bounded executable run-time node is generated in response to the one or more data elements being received.

19. The method of claim 1 wherein the processing logic of the run-time overlay implements at least one generic rule of the overlay template.

20. A non-transitory computer readable medium storing instructions which, when executed by processing circuitry, cause the processing circuitry to:

obtain a first node template comprising a predetermined node structure and one or more rules governing generation of node instances based on the first node template;

generate a first bounded executable run-time node comprising the first node template, a first node instance generated according to the first node template, and an overlay structure, wherein the overlay structure comprises:

a run-time overlay comprising an overlay template and an overlay instance comprising processing logic operable to interact with the first node template and/or the first node instance during execution; and a first ownership overlay defining a first ownership rule associated with the first bounded executable run-time node;

receive a stimulus and an associated context; and in response to the stimulus being received, cause execution of the processing logic of the run-time overlay in accordance with the first ownership rule of the first ownership overlay.

\* \* \* \* \*